United States Patent
Salgado et al.

(10) Patent No.: US 6,762,857 B1
(45) Date of Patent: *Jul. 13, 2004

(54) METHOD AND APPARATUS TO ENABLE PROCESSING MULTIPLE CAPABILITIES FOR A SUB-JOB WHEN USING A SET OF COMMONLY SHARED RESOURCES

(75) Inventors: David L. Salgado, Victor, NY (US); Rodney L Turmon, Rochester, NY (US); Nicholas M. Lamendola, Lima, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,151

(22) Filed: Nov. 29, 1999

(51) Int. Cl.[7] .......................... G06F 15/00; G06F 17/30
(52) U.S. Cl. ...................... 358/1.9; 358/1.15; 358/1.16
(58) Field of Search ................................ 358/1.9, 1.15, 358/1.16, 1.13, 296, 1.14, 1.18, 1.1, 1.17, 401, 1.12

(56) References Cited

U.S. PATENT DOCUMENTS

| | | | |
|---|---|---|---|
| 3,957,071 A | 5/1976 | Kenner | 135/47 |
| 4,821,107 A | 4/1989 | Naito et al. | 358/256 |
| 4,947,345 A | 8/1990 | Paradise et al. | 364/519 |
| 5,021,892 A | 6/1991 | Kita et al. | 358/468 |
| 5,047,955 A | 9/1991 | Shope et al. | 364/519 |
| 5,113,355 A | 5/1992 | Nomura | 395/109 |
| 5,170,340 A | 12/1992 | Prokop et al. | 364/143 |
| 5,175,633 A | 12/1992 | Saito et al. | 358/406 |
| 5,206,735 A | 4/1993 | Gauronski et al. | 358/296 |
| 5,223,948 A | 6/1993 | Sakurai et al. | 358/404 |
| 5,276,799 A | 1/1994 | Rivshin | 395/162 |
| 5,287,194 A * | 2/1994 | Lobiondo | 358/296 |
| 5,307,458 A | 4/1994 | Freiburg et al. | 395/162 |
| 5,327,526 A | 7/1994 | Nomura et al. | 395/115 |
| 5,377,016 A | 12/1994 | Kashiwagi et al. | 358/403 |
| 5,436,730 A | 7/1995 | Hube | 358/401 |
| 5,535,009 A | 7/1996 | Hansen | 358/296 |
| 5,563,986 A | 10/1996 | Suzuki | 395/114 |
| 5,923,826 A | 7/1999 | Grzenda et al. | 395/114 |
| 5,930,465 A | 7/1999 | Bellucco et al. | 395/114 |
| 5,987,226 A * | 11/1999 | Ishikawa et al. | 358/1.13 |
| 6,252,681 B1 * | 6/2001 | Gusmano et al. | 358/468 |
| 6,348,969 B1 * | 2/2002 | Ikeda | 358/1.15 |
| 6,501,559 B1 * | 12/2002 | Salgado et al. | 358/1.15 |
| 6,509,974 B1 * | 1/2003 | Hansen | 358/1.12 |
| 6,570,670 B1 * | 5/2003 | Salgado et al. | 358/1.15 |
| 2002/0055950 A1 * | 5/2002 | Witteman | 707/500.1 |

FOREIGN PATENT DOCUMENTS

JP 58-152821 8/1983

* cited by examiner

*Primary Examiner*—Kimberly Williams
*Assistant Examiner*—Melanie M. Vida
(74) *Attorney, Agent, or Firm*—Perman & Green, LLP

(57) ABSTRACT

Prioritizing a printing system's basic processing resources includes providing a job contention manager (JCM) that adds a first basic job resource to queues of each basic resource which a first video capability requires to perform a first sub-job. The first basic job resources are ready for processing if they are at the top of all of the queues, of all the basic resources, required by the first video capability. The JCM adds a second basic job resource sub-job to queues of each basic resource which a second video capability requires to perform the first sub-job. The second basic job resources, are ready for processing after the first basic job resource, if the first and second basic job resources in the queue are submitted by the same job service and if the second basic job resource is for the same sub-job as the first basic job resource's sub-job.

20 Claims, 15 Drawing Sheets

METHOD AND APPARATUS TO ENABLE PROCESSING MULTIPLE CAPABILITIES FOR A SUB-JOB WHEN USING A SET OF COMMONLY SHARED RESOURCES

CROSS-REFERENCES TO RELATED APPLICATIONS

The present application is related in subject matter to and cross-referenced with U.S. patent application Ser. No. 09/450,145, entitled METHOD AND APPARATUS FOR MANAGING JOB CONTENTION FOR SYSTEM RESOURCES IN AN ELECTROIC REPROGRAPHIC SYSTEM WHERE IMAGES ARE MULTIBANDED, filed by Salgado et al., U.S. patent application Ser. No. 09/450, 147, entitled METHOD AND APPARATUS FOR PROCESSING A HIGH PRIORITY RESOURCE REQUEST IN A SYSTEM USING A SET OF SHARED RESOURCES, filed by Salgado et al., U.S. patent application Ser. No. 09/450,150, entitled METHOD AND APPARATUS TO OPTIMIZE TRANSITION OF RESOURCES FROM A LOWER PRIORITY TO A HIGHER PRIORITY JOB, filed by Salgado et al., U.S. patent application Ser. No. 09/450, 148, now U.S. Pat. No. 6,614,542, entitled METHOD AND APPARATUS TO IMPROVE SYSTEM CONCURRENCY FOR A JOB USING A SET OF COMMONLY SHARED RESOURCES SUCH THAT A SPECIFIC RESOURCE IS USED ONLY FOR A PORTION OF THE JOB, filed by Salgado et al., U.S. patent application Ser. No. 09/450,149, now U.S. Pat. No. 6,570,670, entitled METHOD AND APPARATUS TO ENABLE JOB STREAMING FOR A SET OF COMMONLY SHARED RESOURCES, filed by Salgado et al., and U.S. patent application Ser. No. 09/450, 146, now U.S. Pat. No. 6,501,559, entitled METHOD AND APPARATUS FOR MANAGING JOB CONTENTION FOR SYSTEM RESOURCES IN AN ELECTRONIC REPROGRAPHIC SYSTEM, filed by Salgado et al., which applications, except for U.S. patent application Ser. No. 09/450,145, were filed on the same day as the present Application. The disclosures of the above-mentioned applications are incorporated herein by reference.

BACKGROUND OF THE INVENTION

1. Field of the Invention

This invention relates generally to a multifunctional printing system with one or more queues and, more particularly, to a job contention management architecture which manages the printing system's resources to enable a service to process a job for multiple video capabilities using commonly shared resources.

2. Brief Description of Earlier Developments

Electronic printing systems typically include an input section, sometimes referred to as an input image terminal ("IIT"), a controller, and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:
U.S. Pat. No. 5,170,340 Patentees: Prokop et al. Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:
U.S. Pat. No. 5,047,955 Patentees: Shope et al. Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.
U.S. Pat. No. 3,957,071 Patentee: Jones Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:
U.S. Pat. NO. 4,821,107 Patentees: Naito et al. Issued: Apr. 11, 1989
U.S. Pat. No. 5,021,892 Patentees: Kita et al. Issued: Jun. 4, 1991
U.S. Pat. No. 5,175,633 Patentees: Saito et al. Issued: Dec. 29, 1992
U.S. Pat. No. 5,223,948 Patentees: Sakurai et al. Issued: Jun. 29, 1993
U.S. Pat. No. 5,276,799 Patentee: Rivshin Issued: Jan. 4, 1994
U.S. Pat. No. 5,307,458 Patentees: Fr eiburg et al. Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:
U.S. Pat. No. 5,436,730 Patentee: Hube Issued: Jul. 25, 1995

The concept of a print queue is integral to the operation of various digital reproduction systems. Through appropriate queue management, a job currently in the process of being printed can be interrupted with an interrupt job in a manner disclosed by the following:
U.S. Pat. No. 5,206,735 Patentees: Gauronski et al. Issued: Apr. 27, 1993

Referring particularly to the '735 Patent, a special job is obtained from a mass memory, shown by way of a "job file", and inserted into the queue at a "logical point" with respect to the job currently being processed. When printing reaches the logical point at which the special job was inserted, the job currently being processed is interrupted so that the special job is processed. Upon completion of the processing of the special job, processing of the interrupted job is resumed. The queue disclosed in the '735 Patent is managed, in the normal case, on a first-come-first-serve ("FIFO") basis except when special or interrupt jobs are inserted into the queue. In the illustrated embodiment of the '735 Patent, the interrupt job is inserted into the queue as described above except when an interrupt job is currently in the process of printing. When an interrupt job is currently printing, a second interrupt job is placed behind the interrupt job in process. Essentially, priority is given to the interrupt job currently in process. The concerns associated with interrupting a first interrupt job with a second interrupt job are also addressed in the following patent:

U.S. Pat. No. 5,535,009 Patentee: Hansen Issued: Jul. 9, 1996

The queue management arrangement of the '735 Patent is not optimally suited for use in a multifunctional context because it does not differentiate among job types for the purpose of managing the queue. Consequently, a print job cannot, in many common instances, be given priority over a copy job, or vice versa. Systems particularly well suited for use with a multifunctional printing systems are disclosed by the following references:

US-A4,947,345 Patentees: Paradise et al. Issued: Aug. 7, 1990

Japanese Application 58-152821 Published: August 22, 1983

Referring particularly to the '345 Patent, a first queue is used to store copy and print jobs, while a second queue, communicating with the first queue, is used to store facsimile ("fax") jobs in parallel with the first queue. After a pre-selected number of one or more fax jobs is stored in the second queue, the stored job(s) is placed in front of the'jobs of the first queue so that the one or more fax jobs can be printed ahead of the currently queued copy/print jobs. While the queue management scheme of the '345 Patent accommodates for job differentiation, it only does so in a limited manner. For instance, the fax queue can be given preferential treatment relative to the copy/print queue, so that one or more fax jobs can be printed ahead of a copy or print jobs. No mechanism for treating a given copy or print job preferentially, however, is suggested. Even though U.S. Pat. No. 5,511,150 to Beaudet et al. (Issued Apr. 23, 1996) accommodates for preferential treatment of copy jobs relative to print jobs, it does not do so in a queue context as discussed in the references above. Additionally, in the approach of the '345 Patent, a copy or print job can get "stuck" in the copy/print job queue when multiple fax jobs are given preferential processing treatment relative to the copy/print jobs U.S. Pat. No. 5,113,355 Patentee: Nomura Issued: May 12, 1992

Referring to the 355 patent, it discloses a printer control system for enabling queue identifiers, which identify different print jobs, to be sorted such that those queue identifiers identifying print jobs which require fonts that are already loaded in the print server are placed at the head of a print list, and those queue identifiers identifying print jobs which require fonts that are not loaded in the print server are placed at the end of the print list. The print jobs are then processed in the order that the queue identifiers appear on the print list. When a print job to be processed requires fonts that are not loaded into the system a message is displayed on a display unit in order to inform the operator which fonts need to be loaded into the system.

U.S. Pat. No. 5,327,526 Patentee: Nomura et al. Issued: Jul. 4, 1994

Referring to the 526 patent it discloses a print job control system which processes print requests to set an order of priority for printing print jobs. A print job manager checks the print request and determines what print option is selected and manipulates the queue identifiers associated with respective print jobs and enters them into a print queue table. One feature allows changing the print order thereby overriding the designated print option. Another feature allows for increasing the priority of low priority jobs regardless of the designated print option assuring that the low priority jobs will be printed.

U.S. Pat. No. 5,377,016 Patentee: Kashiwagi et al. Issued: Dec. 27, 1994

Referring to the 016 patent there is disclosed a control circuit which receives advance data representing a predetermined number of copy jobs to be provided from a scanner and data representing a predetermined number of print jobs to be provided from external equipment. The control circuit causes each of the copy jobs and print jobs on the basis of such data to be queued, and the jobs to be processed in a time divisional and parallel manner. Basically, the control circuit gives higher priority to the copy job. The priority order can be changed according to an instruction from a user interface. When a current job has been suspended, the control circuit causes a succeeding job to be processed earlier.

U.S. Pat. No. 5,923,826 Patentee: Grzenda et al. Issued: Jul. 13, 1999

Referring to the 826 patent there is disclosed a printing system comprising a digital reproduction system communicating with a remote document processing station by way of a print server. The printing system includes a first queue of first jobs to be executed with the digital reproduction system maintained at the print server and a second queue of second jobs to be executed with the digital reproduction system maintained at the digital reproduction system. The printing system further includes a queue process communicating with both the first and second queues for forming a composite queue to reflect an order in which the first and second jobs of the first queue and the second queues are to be executed with the digital reproduction system. A representation of the composite queue is then displayed at a user interface disposed at the remote document processing station.

U.S. application Ser. No. 09/015,144, now U.S. Pat. No. 6,252,681.

A method is provided for a multifunctional printing system in which a first job, developed at a first service, and a second job, developed at a second service are placed in a queue for processing. A first value is assigned to the first job and a second value is assigned to the second job, with the first and second values varying in magnitude as a function of the first and second services. In one example, the first job is placed in the queue and a portion thereof is processed. Subsequently, the second job is placed in the queue and processing of the first job is interrupted by the second job if the second value is greater in magnitude than the first value.

The aforenoted queuing approaches, while well intended for their limited purposes, lack the sort of efficient queue management that is required to make multifunctional printing systems having shared resources fully productive. Multifunction printing system's capabilities and uses are expanding at an ever-increasing rate. It is desirable to provide a multifunctional printing system that gives improved productivity by utilizing queue management at the capability and resource sub-job levels in order to maximize the productivity of the system. At the same time, it is desirable to provide a queue management system for a multifunctional printing system facilitating the efficient thruput of all types of jobs which might be encountered by the multifunctional printing system.

The Xerox Corporation Digital Copier Multifunction Systems comprising the DC 240 ST and the DC 265 ST include a Job Contention Manager which provides queue management at the Basic Job Service level. This approach has the ability to concurrently process sub-jobs which do not conflict at the basic resource level. For example, a scan sub-job and a mark sub-job can be carried out concurrently, however, all the capabilities associated with each basic resource for the sub-job are tied up until the sub-job is completed.

A more productive approach as disclosed in U.S. patent application Ser. No. 09/450,146, now U.S. Pat. No. 6,501,559, to Salgado et al., entitled METHOD AND APPARATUS FOR MANAGING JOB CONTENTION FOR SYSTEM RESOURCES IN AN ELECTRONIC REPROGRAPHIC SYSTEM, filed of even date herewith, releases capabilities to other sub-jobs when they are not being used or are required by higher priority sub-jobs. This is accomplished by providing job contention management at the lower level of capability job requests with both capability resource queues and basic resource queues. The present invention extends this prioritization approach to enable a job service to process a sub-job for multiple video capabilities.

The disclosure of each patent or application mentioned or discussed in the above Background is incorporated herein by reference.

SUMMARY OF THE INVENTION

In accordance with the presently disclosed invention there is provided a method and apparatus for prioritizing the use of multifunctional printing system's basic processing resources to enable a job service to process a sub-job for multiple video capabilities (e.g. using various image processing packages) using commonly shared resources and thus streamlining the process. Improved performance and efficiency in processing jobs is provided by the streamlining resulting from the process and apparatus of this invention. It provides the ability to perform more extensive and complicated job processing by a job service. When a job service's sub-job is made "Active", it is made active for all the capabilities the service has proposed for the sub-job.

In accordance with a preferred aspect of this invention, the printing system employs a controller with an improved job contention manager (JCM). The process in accordance with a preferred embodiment of the invention comprises providing each of a plurality of basic resources of the printing system with a queue. One or more job services, at desired times, signals the JCM to carry out a sub-job of a given job. The signal for each of the sub-jobs includes information about the respective sub-job and its, priority and requesting job service. Responsive to the signal, the JCM adds, for a first video capability required by a first sub-job, a corresponding first basic job resource to the queues of each basic resource which the first video capability will require in order to perform the first sub-job. The JCM places the first basic job resources for the first sub-job in an "Active" state ready for processing, if the first basic job resources are at the top of all of the queues, of all the basic resources, required by the first video capability. Responsive to the signal, the JCM adds, for a second video capability required by the first sub-job, a corresponding second basic job resource sub-job to the queues of each basic resource which the second video capability will require in order to perform the first sub-job. The JCM places the second basic job resources, which follow the first basic job resource in a basic resource queue, in an "Active" state ready for processing after the first basic job resource, if the first and second basic job resources in the queue are submitted by the same job service and if the second basic job resource is for the same sub-job as the first basic job resource's sub-job.

In accordance with another alternative preferred embodiment of the present invention there is provided a method of managing the processing of a plurality of jobs in a multifunctional printing system in which at least one job is inputted for processing at one or more job services. The process comprises providing a controller with a job contention manager (JCM) for prioritizing the printing system's basic processing resources to enable the JCM to process a job for multiple video capabilities. A plurality of capability resources are provided for carrying out the one or more job services. A plurality of basic resources of the printing system are also provided. Each capability resource contains a list of the basic resources it needs to carry out its capability and each basic resource contains a list of the capability resources that depend upon it. A sub-job queue is provided for each capability resource and each basic resource.

Each respective job service, at a desired time, signals the JCM to carry out a sub-job of said at least one job. The signal for each of the sub-jobs includes information about the respective sub-job and its priority (FIFO or job based priority) and requesting job service. Responsive to a signal, the JCM creates for the at least one sub-job received from the job service, respective capability job resources containing the information, and adds each such capability job resource, based on priority, to the respective capability resource, job queue. Thereafter the JCM adds, for each capability job resource, component basic job resources to the queues of each basic resource which a respective capability resource will require. The JCM places the first basic job resources, which are components of a first capability resource, for the at least one sub-job, in an "Active" state ready for processing, if the first basic job resources are at the top of all of the queues, of all the basic resources, required by the first capability resource. The JCM then places the second basic job resources, which are components of a second capability resource, which follow the first basic job resource in a basic resource queue, in an "Active" state ready for processing after the first basic job resource, if the first and second basic job resources in the queue are submitted by the same job service and if the second basic job resource is for the same sub-job as the first basic job resource's sub-job.

In accordance with another preferred embodiment of this invention an apparatus is provided for prioritizing the use of multifunctional printing system's basic processing resources. The apparatus employs a controller having a job contention manager (JCM). The apparatus includes: a plurality of basic resources of the printing system with each such resource having a queue; signal means, for one or more job services, at desired times, to signal the JCM to carry out a sub-job of a given job, the signal for each of the sub-jobs including information about the respective job and its job service and priority.

The apparatus further includes means for each respective job service, at a desired time, to send a signal to the JCM to carry out a sub-job of the at least one job, the signal for each of the sub-jobs including information about the respective sub-job and its job service and priority. The JCM includes: means for creating respective capability job resources containing the information, and for adding each such capability job resource, based on priority, to the respective capability resource, job queue; means for adding, for each capability job resource, component basic job resources to the queues of each basic resource which a respective capability resource will require; means for placing first basic job resources, which are components of a first capability resource, for the at least one sub-job, in an "Active" state ready for processing, if the first basic job resources are at the top of all of the queues, of all the basic resources, required by the first capability resource; means for placing the second basic job resources, which are components of a second capability resource, and which follow the first basic job resource in a basic resource queue, in an "Active" state ready for processing after the first basic job resource, if the first and second basic job resources in the queue are submitted by the same job service and if the second basic job resource is for the same sub-job as the first basic job resource's sub-job.

An alternative apparatus in accordance with a further preferred embodiment of this invention is provided for managing the processing of a plurality of jobs in a multi-functional printing system in which at least one job is inputted for processing at one or more job services. The apparatus includes a controller having a job contention manager (JCM) for prioritizing the printing system's basic processing resources. The apparatus comprises: a database which is associated with the JCM. The database includes a plurality of capability resources for carrying out the one or more job services and a plurality of basic resources of the printing system, with each capability resource containing a list of the basic resources it needs to carry out its capability and each basic resource containing a list of the capability resources that depend upon it. The database includes a sub-job queue for each capability resource and each basic resource. Signal means are provided, for permitting each respective job service, at a desired time, to signal the JCM to carry out a sub-job of the at least one job, with the signal for each of the sub-jobs including information about the respective job and its priority and requesting job service.

Each respective job service including means, at a desired time, for sending a signal to the JCM to carry out a sub-job of the at least one job, the signal for each of the sub-jobs including information about the respective sub-job and its job service and priority. The JCM includes: means for creating respective capability job resources containing the information, and adding each such capability job resource, based on priority, to the respective capability resource, job queue; means for adding, for each capability job resource, component basic job resources to the queues of each basic resource which a respective capability resource will require; means for placing first basic job resources, which are components of a first capability resource, for the at least one sub-job, in an "Active" state ready for processing, if the first basic job resources are at the top of all of the queues, of all the basic resources, required by the first capability resource; and means for placing second basic job resources, which are components of a second capability resource, which follow the first basic job resource in a basic resource queue, in an "Active" state ready for processing after the first basic job resource, if the first and second basic job resources in the queue are submitted by the same job service and if the second basic job resource is for the same sub-job as the first basic job resource's sub-job.

The prioritization approach used by the JCM in the process and apparatus of this invention can be FIFO or a combination of FIFO and job based priority as desired.

DESCRIPTION OF THE INVENTION

While the present invention will hereinafter be described in-connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
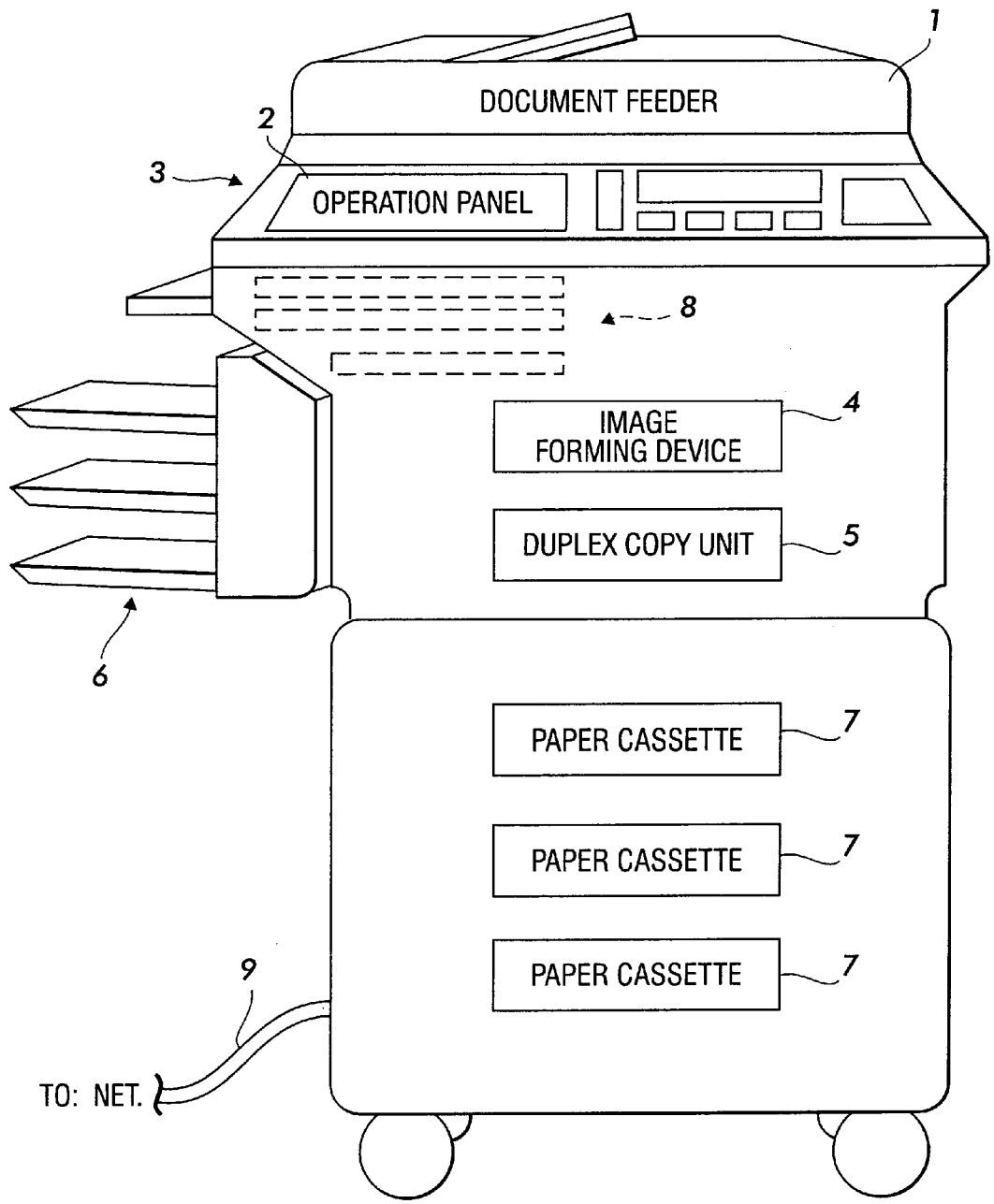
FIG. 1 is a perspective view of a networked digital copier suitable for receiving a job developed in accordance with the present invention.

Referring to FIG. 1 of the drawings, there is shown a digital copier system of a known type suitable for use with a preferred embodiment of the invention. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
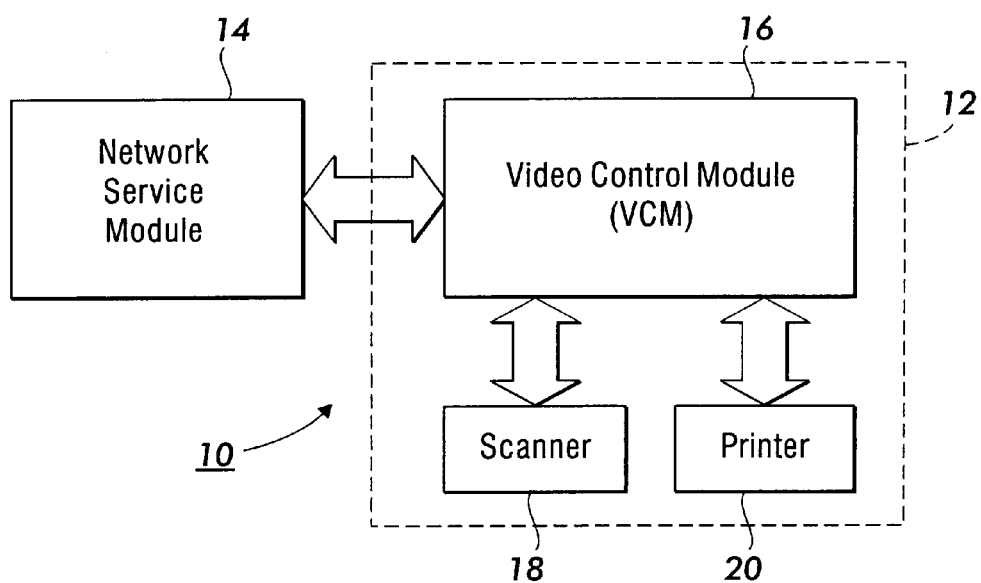
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (IP) 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
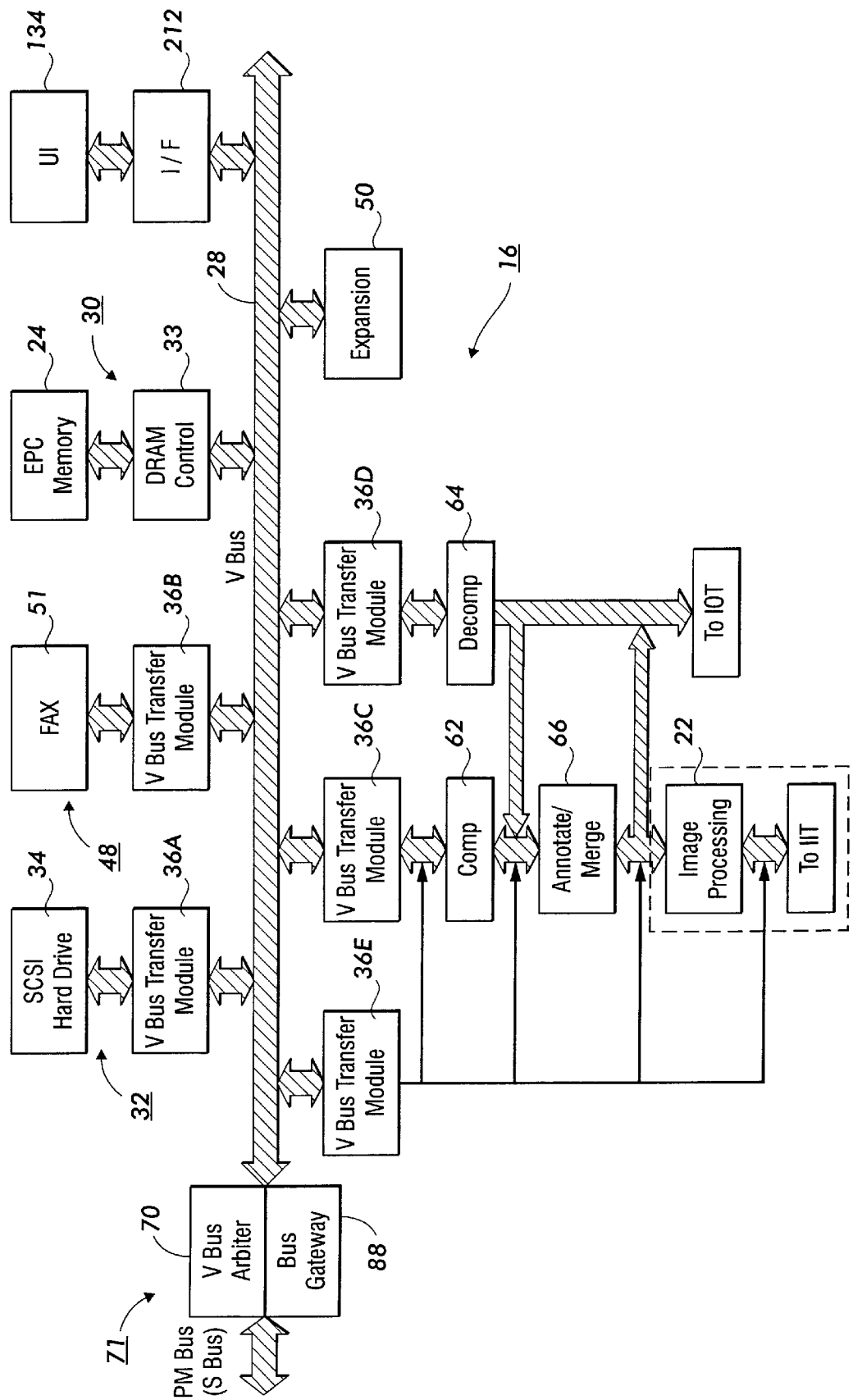
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules, however, any desired amount of memory could be employed. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of the transfer module 36a through use of a suitable interface and a SCSI line.

Figure 4:
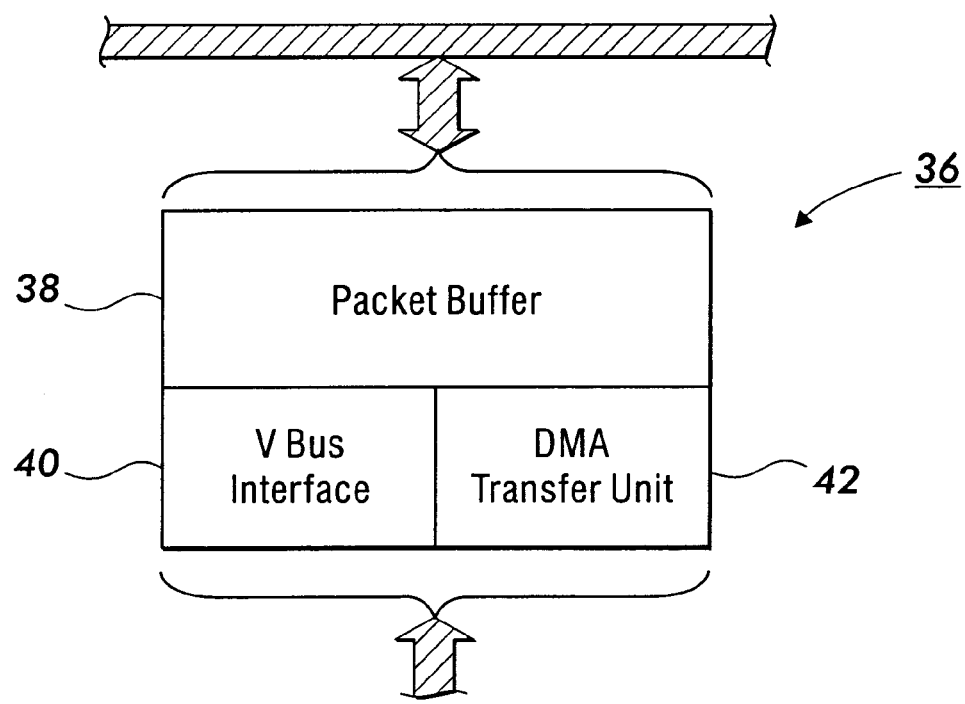
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42 . The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
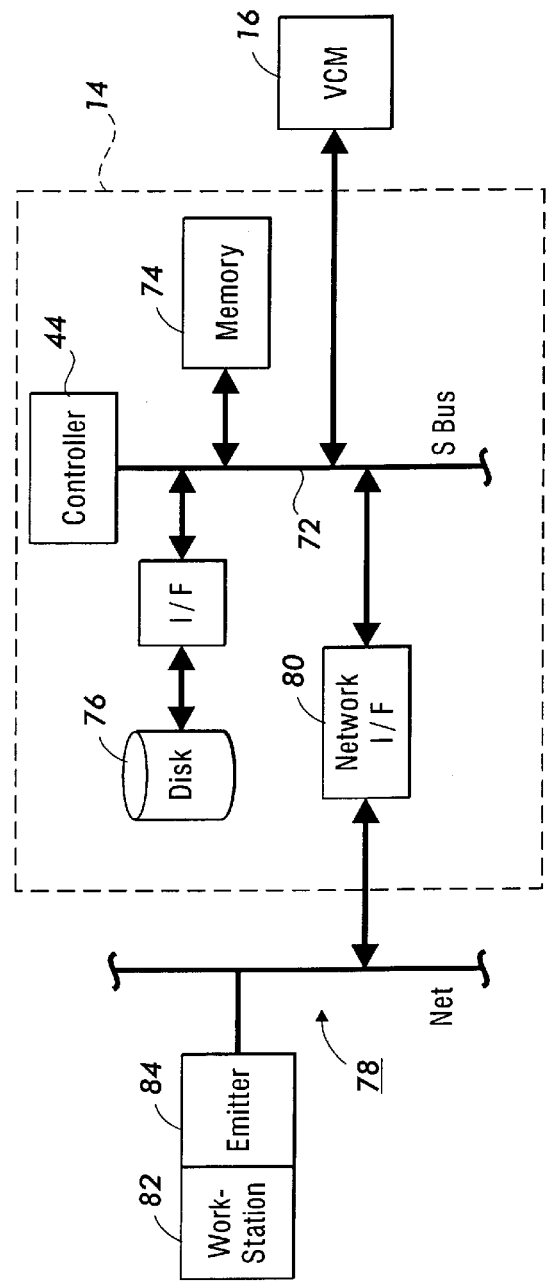
FIG. 6 is a block diagram of a network controller for the printing machine of FIG. 2.

Adjustment of the packet size is achieved with the VBus interface 40 (FIG. 4) and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, image transfer is facilitated with a DMA transfer unit which employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
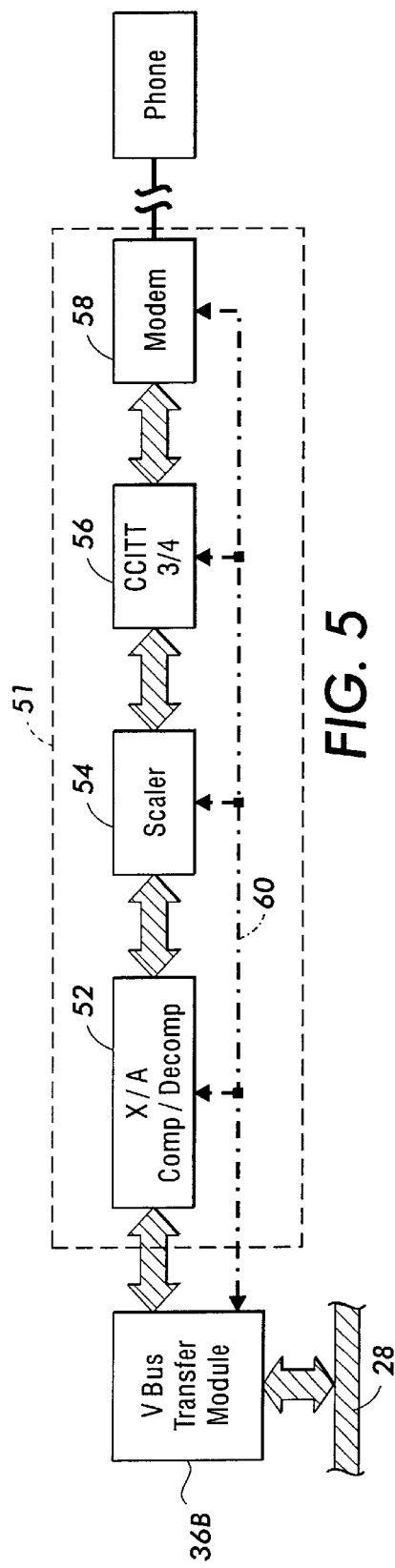
FIG. 5 is a block diagram of a facsimile card used in conjunction with the video control module of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processors should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module. As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. Thresholding and screening are common imaging functions relating to the concept of applying an image screen to improve the quality of the image. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
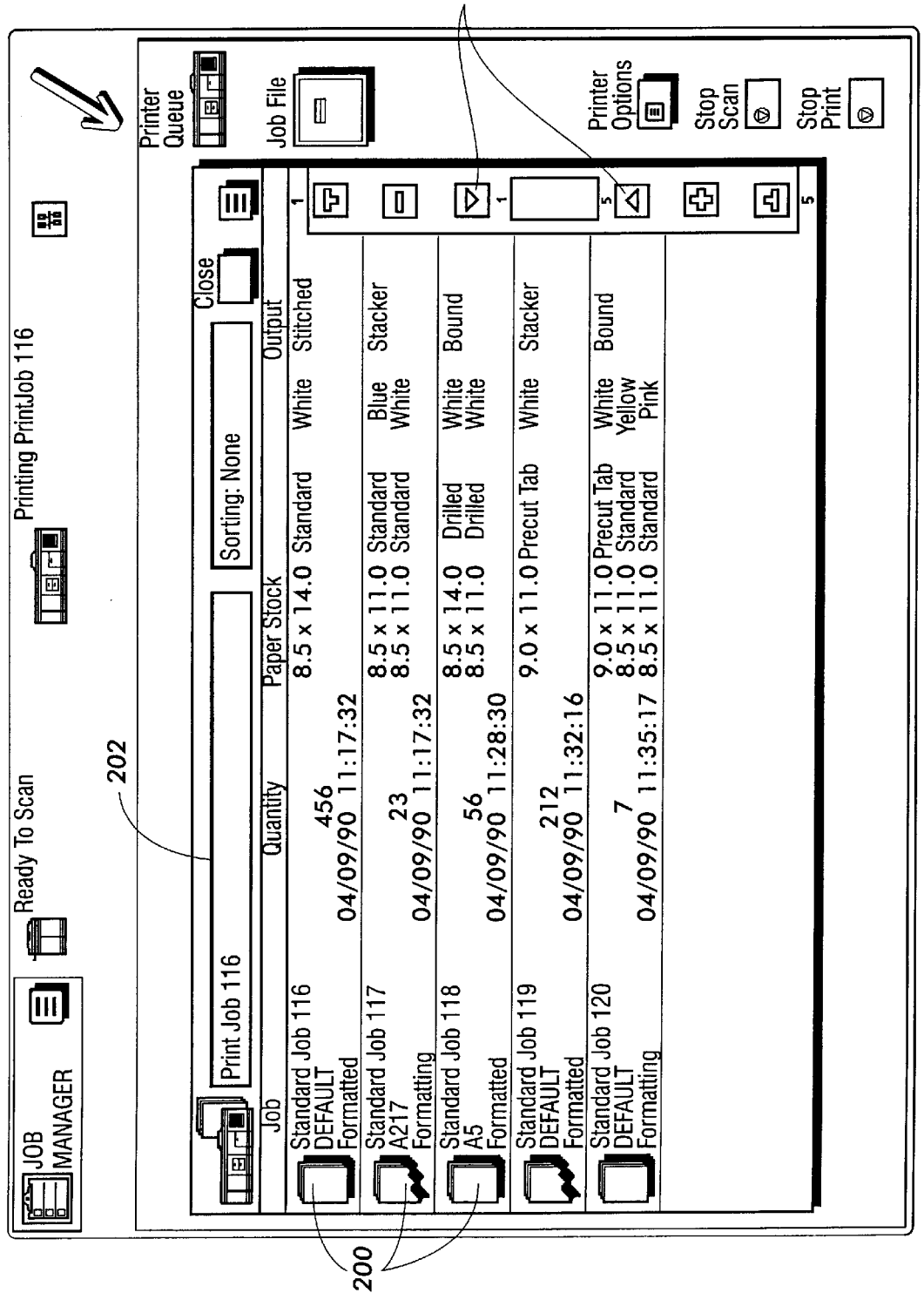
FIG. 7 is an elevation view of a queue used to store jobs pursuant to processing thereof.

As previously noted the Xerox Corporation Digital Copier Multifunction Systems comprising the DC 240 ST and the DC 265 ST include a Job Contention Manager which provides queue management at the External or Basic Job Service levels. Referring to FIG. 7, those systems include a queue of jobs 200 ready for processing with the printer 20 as shown in FIG. 1. As with other conventional print queues, the job currently being printed is displayed in a window 202 and buttons 204 can be employed to scroll the list of jobs up or down. It should be appreciated that in a multifunctional machine of the this type and those discussed in the Background above, more than one queue is employed to accommodate for the various Basic Job Services offered. For example, jobs waiting to be scanned would reside in a scan queue while jobs waiting to be faxed would reside in a fax queue. Essentially the print or mark queue of FIG. 7 may be just one of the plurality of Basic Job Service queues employed in a multifunction printing system. Additionally, it should be appreciated that jobs may be inserted into the queues in a manner consistent with that disclosed by U.S. Pat. No. 5,206,735. Finally, it will be appreciated that the queues could be maintained in, among other locations, the VCM of FIG. 3 or the Network Service Module of FIG. 6.

In any multifunctional product (also referred to below as "MF Engine"), such as the printing system 10 described above, there is always the potential of multiple users requiring access to one or more subsystems at the same time. This access contention can occur in several areas of the MF Engine, either as contention for a single resource e.g., EPC memory 24 (FIG. 3), or as a contention for multiple kinds of resources e.g., EPC memory and IIT. When a contention situation arises, the printing system must respond in a predictable, and controlled manner that satisfies the various users.

In the Xerox DC 240 ST and the DC 265 ST Multifunction Systems, at least two contention management methods are contemplated, as more fully described in U.S. application Ser. No. 09/015,144, now U.S. Pat. 6,252,681, to Salgado et al., which is incorporated by reference herein, (hereinafter "Salgado '681").

1. First In First Out (FIFO) Job Management.

In this method contention is handled on a first come first serve basis. Jobs submitted ahead of other jobs have first use of the required Basic Job Service. Other jobs requesting that service are numerically ordered by their time of arrival and eventually have the opportunity to use the service.

2. Prioritized Job Management

In this method access to resources is managed with a "Key Operator/System Administrator ("KO/SA") defined algorithm. With this algorithm, the KO/SA can arrange to have jobs defined according to job type, immediate walkup need, history of interruptions and other relevant factors. The algorithm can be configured to manage job contention in accordance with the desires of a typical printing system user. Since it is flexibly programmable, the algorithm can be made to accommodate for FIFO. In other words, FIFO is a subset of the capabilities of this algorithm.

Salgado '681 discloses at least five job types that are handled by the KO/SA priority algorithm:

1. Copy Print or Walk-Up Jobs: Walk up user jobs requiring the use of the IIT and the corresponding marking resource;

2. Auto Report Print: Reports that are automatically printed, such as reports of machine or copier use, error logs, fax reports, etc. The reports, which are defined by the SA/KO, are printed from memory resources and require marking engine usage;

3. Net Print: Included in this job category are the following:
   a) Jobs arriving from network sources, via the network service module 14 (FIG. 1), which require marking resource,
   b) Network service module (also referred to as "ESS") soft mailbox jobs activated by a walk-up or remote user, and
   c) Any other jobs originating from the ESS or network;

4. Fax Mailbox: Included in this job category are the following:
   a) Fax receives which have been stored on the system for printout at a user's request,
   b) Local reports such as system usage or fax logs, and
   c) Any other jobs originating from the EPC memory 24 (FIG. 3) or the printing system (also referred to as "MFSYS");

5. Fax Print: Incoming Fax jobs that are meant to be printed immediately. Such jobs are captured in EPC memory 24 and then printed immediately.

The approach of Salgado '681 provides a system job which corresponds to a work request made by a user. The user's work request is made at the MF Engine's user interface or External Job Service (EJS). For example, a copy job corresponds to a user's request to perform a copy operation. Each EJS job breaks down into multiple sub-jobs. Each sub-job corresponds to the work responsible for a basic job operation which is processed by a Basic Job Service (BJS). Copy jobs break down into scan, image processing, and mark sub-jobs.

Processing a job by a Basic Job Service requires use of video 111 hardware. Video 111 hardware includes the compressor, decompressor, ipsi board, input channel, .output channel, and loopback channel. Multiple sub-jobs can require the use of the same video 111 hardware. The Job Contention Manager of Salgado '681 manages the use of the video 111 hardware and which sub-job acquires the hardware when a contention decision is required at the level of the Basic Job Service, based on the priority schemes noted above.

The following terminology should be useful in obtaining a more complete understanding of the present description:

Authorized User: a user having a higher authority level than a casual user, but access rights less than that of a KO/SA. This is a reserved authority level intended for VIP Users.

Job Priority: A priority assigned according to job or user type. An exemplary priority scheme, based on job type, is provided in Salgado '681.

Marking Resource: The resource used to print a job on a given media type.

Memory Resource: Types of Read/Write memory used by the printing system, e.g. memories 24, 34 (FIG. 3), 74 and 76 (FIG. 6).

Marked Job: A job which has been printed. This term is more generic than "printed job" and does not imply a particular method used for writing to the type of media.

Next to Print: This is the nomenclature for a job which is at the top of the queue of jobs and under stable/normal conditions, will be the "next to print" from the queue.

Decompressor: Video 111 hardware that decompresses a compressed image back to its "raw" data.

Compressor: Video 111 hardware that compresses an image based on a conventional compression algorithm.
Loop back Channel, Input channel and Output Channel: Comprise video channels used to physically transfer image data.
ips1: Physical component that performs a number of imaging functions such as reduction, enlargement, lighter, darker, and contrast.

This invention embodies many of the elements disclosed in U.S. patent application Ser. No. 09/450,146, now U.S. Pat. No. 6,501,559, to Salgado et al., entitled METHOD AND APPARATUS FOR MANAGING JOB CONTENTION FOR SYSTEM RESOURCES IN AN ELECTRONIC REPROGRAPHIC SYSTEM, filed of even date herewith, ("Salgado '559") and those elements are included hereafter in an effort to more clearly describe the various embodiments of this invention. This invention proposes an expansion of the method and apparatus described in Salgado '559 to enable a job service to process a job for multiple video capabilities using commonly shared resources. This invention provides the ability to perform more extensive and complicated job processing by a job service.

In accordance with this invention the improved method and apparatus for managing contention for a system's resources among multiple sub-jobs provides more efficient processing of a job using multiple video capabilities. In accordance with preferred embodiments of this invention it is also possible to do one or more of the following: 1) process multiple sub-job requests for resources, 2) provide concurrent job processing when a contention condition does not exit, 3) assign basic resources to a sub- job based on its priority, 4) suspend a sub-job's use of resources in favor of a higher priority job, 5) transfer resources from a lower priority sub-job to a higher priority sub-job, 6) provide quick processing of BJS' video resource request for each image, and 7) expand for additional video resources and video capabilities.

Figure 8:
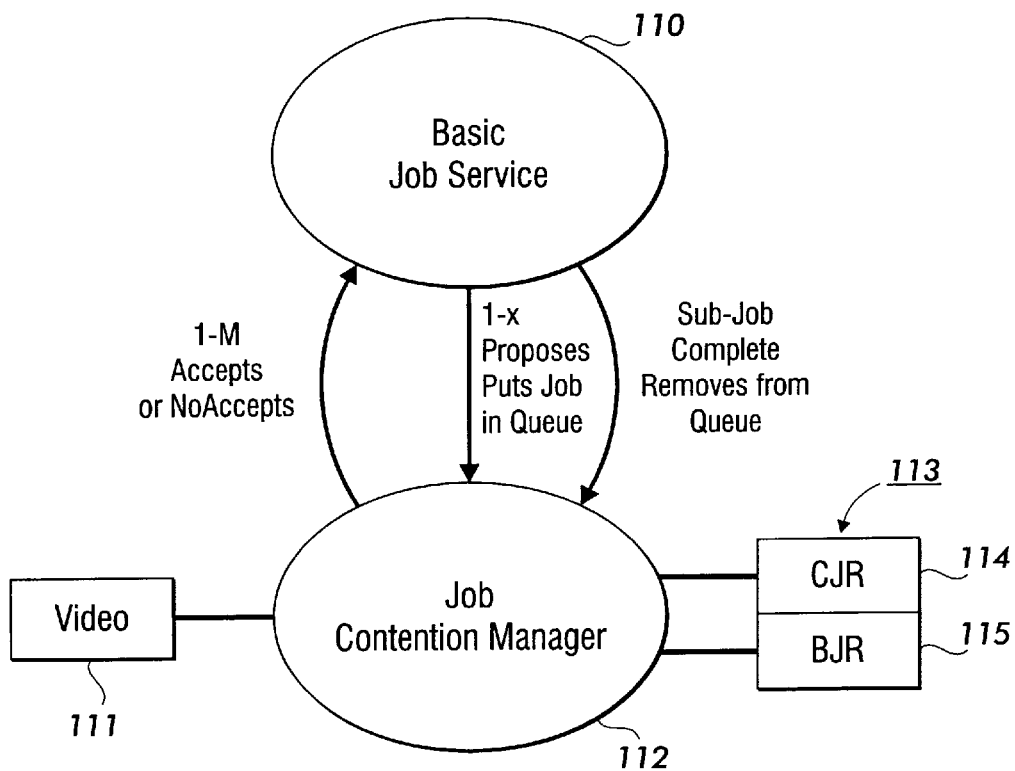
FIG. 8 is a schematic view showing the signal interaction between the Basic Job Service (BJS) and the JCM.

Referring to FIG. 8, the Job Contention Manager (JCM) 112 of this invention controls the allocation of resources at the level of the basic resources. As shown in FIG. 8 it tracks and assigns video resource requests received by the JCM 112 from the BJS 110. The requests between the JCM 112 and the BJS 110 use a Propose/Accept/No Accept protocol. Table 1 provides examples of typical External Job Services and the BJS sub-jobs which they entail for an exemplary Multifunction Printer (MFP). It is within the scope of this invention to provide additional EJS and BJS 110 services as may be desired and Table 1 is provided only by way of Example.

TABLE 1

JOB SERVICES

| EXTERNAL JOB SERVICES | COPY | PRINT | FAX PRINT | FILE | FAX OUT | REPORT PRINT | TEST PATTERN PRINT |
|---|---|---|---|---|---|---|---|
| BASIC JOB SERVICES | Scan | ESS Input | ESS Input | Scan | Scan | Report Generator | Internal Image Generator |
|  | ±IP Mark | Mark | Mark | ±IP ESS Output | ±IP ESS Output | Mark | Mark |

The Basic Job Service (BJS) breaks up the External Job Service request into a series of sub-job requests as shown in Table 1. As shown in FIG. 8, in accordance with this invention, for each sub-job the BJS 10 calls upon the Job Contention Manager (JCM) 12 with a "Propose" for video resources. The JCM provides a set of video capabilities or Capability Resources (CR) for use by the BJS as exemplified by Tables 2a and 2b. Each CR uses a specific set of video 111 hardware or Basic Resources (BR).

TABLE 2a

VIDEO CAPABILITIES

| CAPABILITY RESOURCES | PRE-SCAN | SCAN COMPRESSED | IP ANNOTATE | MARK DECOMPRESSED |
|---|---|---|---|---|
| BASIC RESOURCES | Loopback Channel IPS1 | Compressor Input Channel | Input Channel Loopback Channel Output Channel Compressor Decompressor | Output Channel Decompressor |

TABLE 2b

CAPABILITY RESOURCES

| CAPABILITY RESOURCES | ESS INPUT NONRESCON-VERSIONS | ESS OUTPUT | REPORT GENERATOR | INTERNAL IMAGE |
|---|---|---|---|---|
| BASIC RESOURCES | Loopback Channel Compressor | Output Channel | Decompressor Output Channel | IPS1 Input Channel |

Tables 2a and 2b provide examples of typical Capability Resources (CR) and the Basic Resources (BR) or video resources which they utilize in an exemplary Multifunction Printer (MFP). It is within the scope of this invention to provide additional CRs and BRs as may be desired and Tables 2a and 2b are provided only by way of Example. By way of example, as shown in Tables 2a and 2b the Scan capability (CR) uses the compressor and the input channel Basic Resources and the ESS Input capability (CR) uses the loopback channel and compressor BRs.

The basic architecture of the system for carrying out the method of this invention for managing contention for a system's resources among multiple sub-jobs and how those resources are shared will now be described in detail by reference to FIGS. 8, 9, 10, 11 and 15. The flow diagrams shown in these Figures comprise a first preferred embodiment of the invention which uses a simple First In/First Out (FIFO) prioritization scheme.

Referring to FIG. 8, when the Basic Job Service 110 is ready to process a sub-job, it sends an image "Propose" as described above, for each image it needs to process, to the Job Contention Manager 112. The Job Contention Manager 112 maintains at least a two-level interconnected database 113. The first level 114 corresponds to the Capability Resources (CR). The second level 115 corresponds to the Basic Resources (BR) which are essentially the video resources (Video 111). The database 113 may have any desired number of levels and the two level database is described by way of example. Each Capability Resource in the database 114 contains a list of the Basic Resources it needs. Correspondingly, each Basic Resource in the database 115 maintains a list of the CRs that depend upon it. This interconnected database is created on system power up.

The Job Contention Manager 112 also owns the system's contention algorithm (settable by SA/KO) which in a preferred embodiment is essentially similar to the algorithm proposed in Salgado '681, which is incorporated by reference herein, however, it may be, any desired contention algorithm as determined by the SA/KO. In Salgado '681 the contention algorithm is FIFO or job service priority based or a combination of both. When a job is created, the job contains priority. ordering data elements including priority, submission time, and last modification time. preferably includes the job identifier, its priority information, the video capability required, and the requesting BJS identification. For example, the Scan BJS needs to scan a copy job (id: 3-1) form the DADH (document handler). For each image the scanner needs to input, the Scan BJS 110 calls the JCM 112 with a "Propose" (e.g. BJS service: Scan, job: 3-1, job priority: XXX, capability: ScanCompressed, . . . ).

Figure 9:
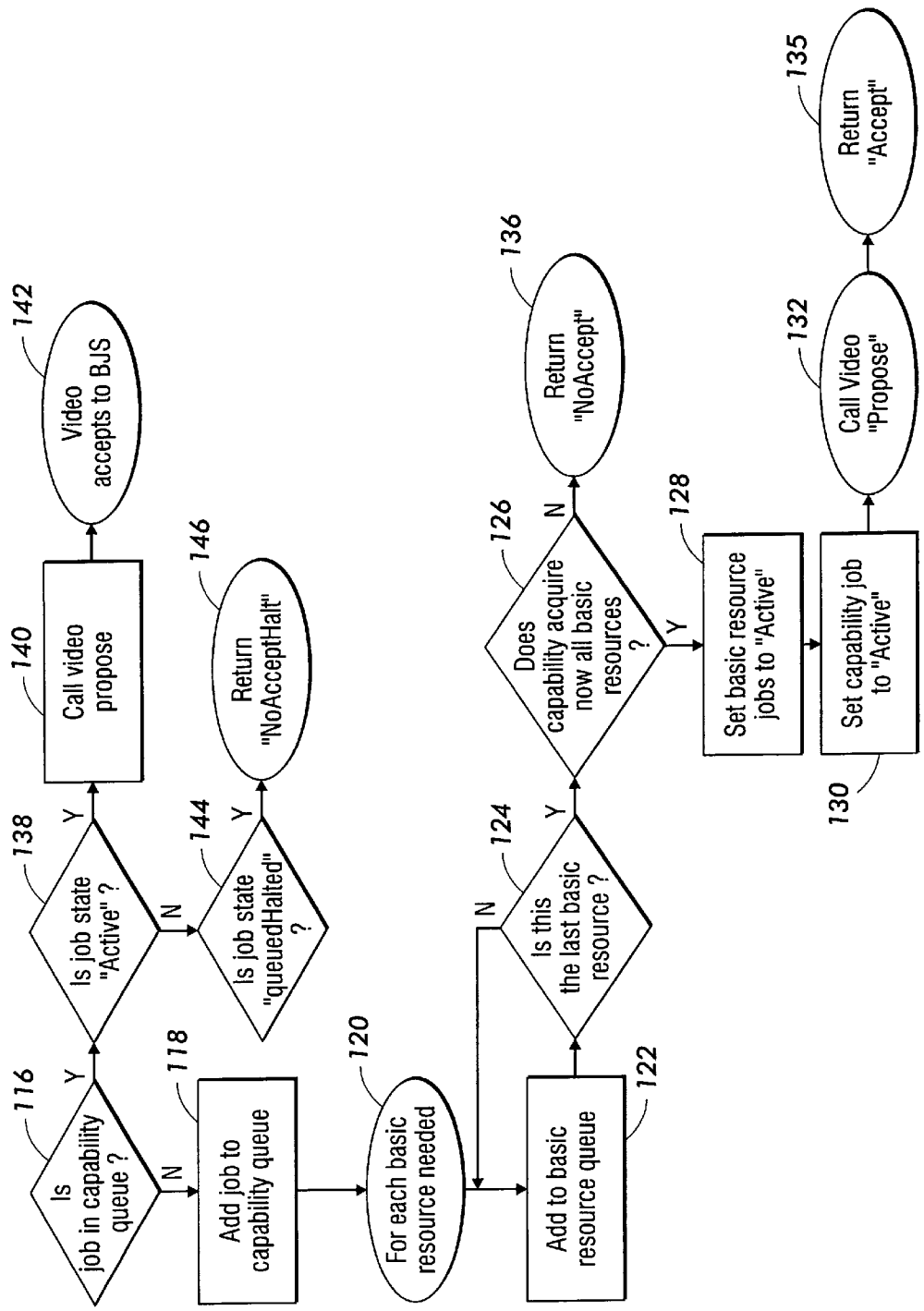
FIGS. 9, 10 and 11 comprise a schematic flow diagram depicting the manner in which jobs progress in a FIFO priority approach as a function of a preferred aspect of a contention management scheme embodied in the present invention.

Referring now to FIG. 9 a simplified FIFO only version of a Job Contention Manager (JCM) 112 for managing contention for a system's resources among multiple sub-jobs is described. On the first request from a BJS 110 for a subjob, the element 116 determines that the sub-job is not in a capability job service queue in the database 114 and signals element 118 to that effect. The JCM 112 then creates a Capability Job Resource (CJR) containing the above data. Element 118 adds the CJR to the CR's job list or queue in the database 114. The JCM 112 then walks or scans through the list of basic resources (the capability to basic resources mapping is determined by reading a table defining these mappings, see Table 2a and 2b), required for the CR, for each basic resource the CR needs. This is accomplished by cycling through elements The capability to basic resources mapping is determined by reading a table defining these mappings. For each basic resource the CR needs as determined by element 120 a Basic Job Resource (BJR) is created and added to each basic resource's job list or queue in database 115 by element 122.

For a specific sub-job request, the set of data common to the Capability Job Resource (CJR) and Basic Job Resource (BJR) is termed a job resource. A resource's job list is the list or queue of requesting sub-jobs needing the capability or basic resource. When a BJR is added to a basic resource's queue, the BJR is placed in a position based on job priority. The top of the queue is the highest priority job with each subsequent job having a decreasing priority. The priority of the sub-job may be preferably determined as in Salgado '681, namely FIFO or job based priority or a combination thereof, however, it may be determined in accordance with any desired conventional prioritizing approach. For this exemplary embodiment it is FIFO based.

For each added BJR, the JCM 112 determines the state of the Basic Job Resource. If the BJR is the highest priority job within the basic resource's job list (top of the queue), the state is "bjsActive" if no other "bjsActive" BJR is in the list. If there is another "bjsActive" BJR, then the added Basic Job Resource's state is "bjsAcquiring". If the added Basic Job Resource is not at the top of the queue, then the state is "bjsQueued".

At this point, the JCM 112 needs to determine the overall state of the BJS' "Propose" request (in this invention, it is the state of the CJR). If all its component BJR's are "bjsActive" as determined by element 126 then element 128 sets all BJR's states to "bjsActive". Element 130 then sets the CJR's state to "cjsActive". The JCM 112 at 132 then forwards the BJS Propose to the component basic services (Video 111) for processing. Video 111 processes the request as normal and sends an Accept 135 to the BJS via the JCM.

In certain scenarios, a job service uses multiple, capability resources to process a sub-job. For example, the Image Processing BJS may need to use several capability resources such as ipCreateBlankImage, ipAnnotateImage, ipRotateImage to process a particular sub-job. To enable a job service to efficiently process a sub-job for multiple video capabilities in accordance with this invention the JCM 112 follows its normal rules and places a CJR and appropriate component BJRs for each sub-job capability request from the BJS 110. As normal the CJR and BJRs are placed in the corresponding sub-job queues in priority order. However, in accordance with this invention the determination of whether or not a BJR is "bjsActive" is modified as follows: in addition to the above method to make a BJR "bjsActive", a new sub-job will be "bjsActive" if, the currently active BJR (BJR A) is for the same sub-job as the new BJR (BJR B) and if BJR A and BJR B are submitted by the same basic service. As with the algorithm of Salgado '559 the new CJR's state is active if all its BJRs are "bjsActive". In this way the JCM enables the BJS to use multiple video capabilities when processing a sub-job. Therefore, a BJS service can "Propose" for multiple capabilities prior to the completion of its current sub-job. This allows a job service to perform more complicated job processing than it otherwise could.

If the BJS' component BJRs have a combination of "bjsActive" and "bjsAcquiring" states, the CJR's state is "cjsAcquiring". Otherwise, the CJR's state is "cjsQueued". The JCM 112 then updates all of the CJR's respective BJRs to reflect the overall state. In other words, if the Capability Job Resource's (CJR's) state is "cjsQueued", all component Basic Job Resource's (BJR's) states are set to "bjsQueued".

Figure 15:
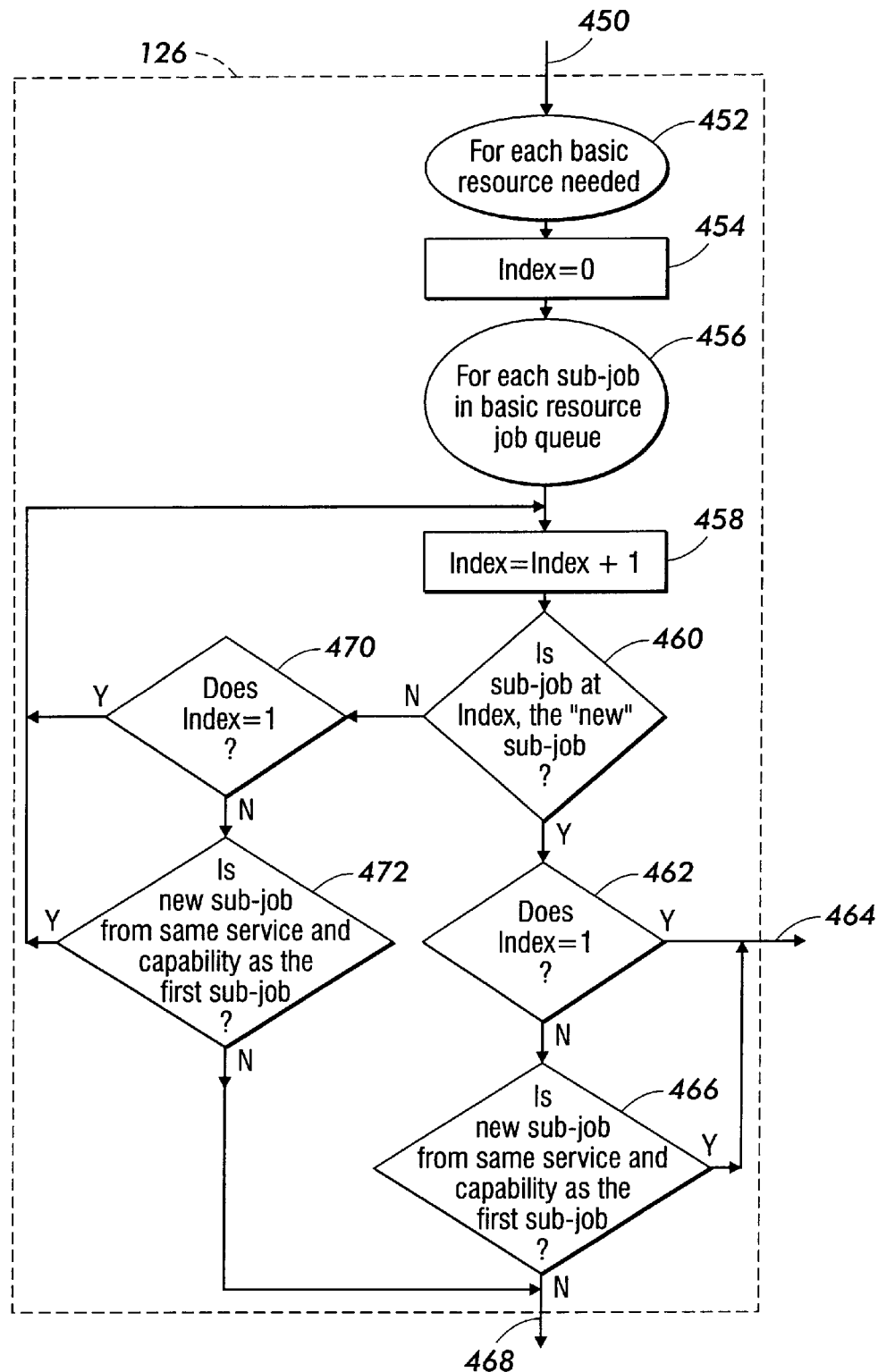

Referring now to FIG. 15 element 126 is shown in greater detail in order to illustrate multiple capability resources can be streamed in accordance with a preferred embodiment of this invention. The signal 450 from element 124 is coupled to element 452. For each basic resource needed by a sub-job an index 454 is set at 0. For each sub-job in a BR queue element 456 signals index 458 to increment by 1. Element 460 then determines if the sub-job at the index position of element 458 is the new sub-job. If it is, then element 462 determines if the index position is 1, which is the top job in the BR queue. If it is, then signal 464 is coupled to element 128. Then as described above element 128 sets all BJR's states to "bjsActive". Element 130 then sets the CJR's state to "cjsActive". The JCM 112 at 132 then forwards the BJS Propose to the component basic services (Video 111) for processing. Video 111 processes the request as normal and sends an Accept 135 to the BJS via the JCM.

If element 462 determines that the index position is not 1, then it signals element 466, which determines if the new sub-job is from the same service and for the same job as the $1^{st}$ sub-job. If the new sub-job is from the same service and job, element 466 provides a signal 464 to element 128. Then as described above element 128 sets all of the new sub-job's BJR states to "bjsActive". Element 130 then sets the CJR's state to "cjsActive". The JCM 112 at 132 then forwards the BJS Propose to the component basic services (Video 111) for processing immediately after the prior "bjsActive" sub-job submitted by the same service and for the same job. Video 111 processes the request in a capability resource streaming sequence, and sends an Accept 135 to the BJS via the JCM. If element 466 determines that the new sub-job is not from the same service and job as the first sub-job in the BJR queue then it forwards signal 468 to element 136 so that the JCM 112 provides a "NoAccept" to the BJS 110. In this case, the BJS 110 has not acquired all the video 111 (basic) resources necessary for sub-job processing. The BJS 110 then proposes again at a future time based on an internal timer (not shown).

If element 460 determines that the sub-job at the index position of 458 is not the new sub-job, then element 470 determines if the index position of element 458 is equal to 1. If it is, then element 470 recycles the sub-job to element 458 which increases the index position by 1. If the index 458 does not equal 1 then element 470 signals element 472, which determines if the sub-job is from the same service and job as the 1$^{st}$ sub-job. If it is, then element 472 recycles the sub-job to the index 458 until the index 458 reaches the position of the new sub-job. If the sub-job is not from the same service and job as the 1$^{st}$ sub-job, then element 472 forwards a signal 468 to element 136 so that the JCM 112 provides a "NoAccept" to the BJS 110. In this case, the BJS 110 has not acquired all the video 111 (basic) resources necessary for sub-job processing. The BJS 110 then proposes again at a future time based on an internal timer (not shown).

If element 126 determines that the BJRs for a new sub-job follows prior BJRs in their queues which are "bjsActive", and if it determines that the BJRs were submitted by the same BJS and for the same sub-job as the top job in the queue, then element 128 sets the new job's BJRs to "bjsActive" and then element 130 sets the corresponding CJR to "cjsActive" and the JCM 112 at 132 then forwards the BJS Propose to the component basic services (Video 111) for processing immediately after the prior sub-job in the queue. Video 111 processes the request as normal and sends an Accept 460 to the BJS via the JCM.

Once, the BJS 110 "Proposes" for a sub-job, the JCM 112 tracks the BJS' sub-job request using its corresponding capability and Basic Job Resources (CJRs and BJRS) in the databases 114 and 115. For all subsequent Proposes from the BJS 110 for this sub-job, the JCM 112 uses the corresponding CJR's state to determine acceptance (Accept) or rejection (NoAccept). In this case the JCM 112 determines at element 116 that the sub-job is already in a queue (capability job list). If the sub-job is in the capability queue the JCM 112 then determines at element 138 if the capability's job state is "cjsActive". If it is, then the JCM 112 forwards the BJS Propose to the component basic services (Video 111) for processing. Video 111 processes the request as normal and sends an Accept to the BJS 110 via the JCM 112.

If the job state of the sub-job is not "cjsActive" as determined by element 138 then the JCM 112 determines at element 144 if it is "cjsAcquiring" or "cjsQueued". If it is "cjsAcquiring" or "cjsQueued" then the JCM 112 element 146 returns a "NoAccept" to the BJS 110, which proposes again at a future time based on an internal timer (not shown).

Figure 10:
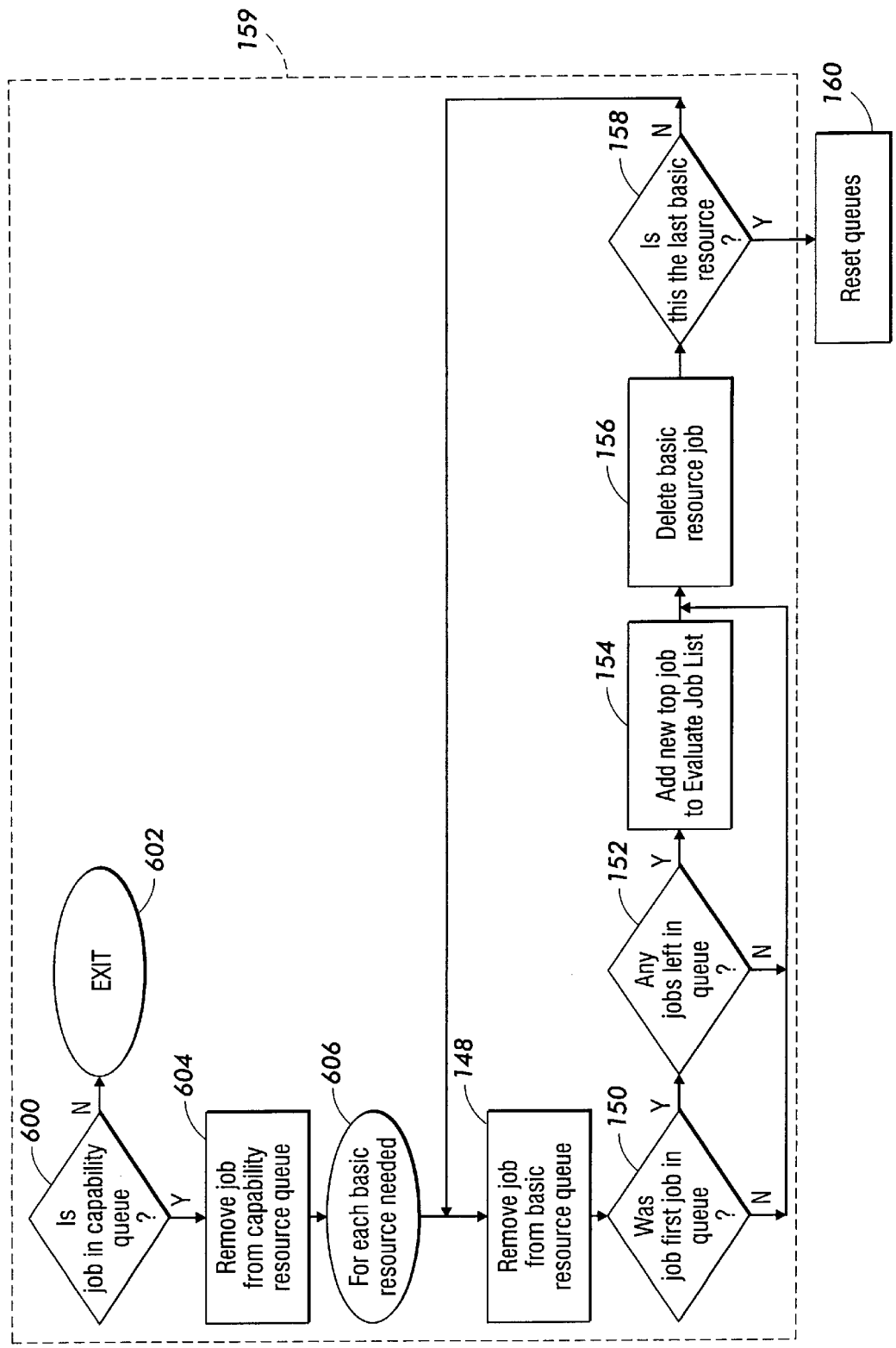
Figure 11:
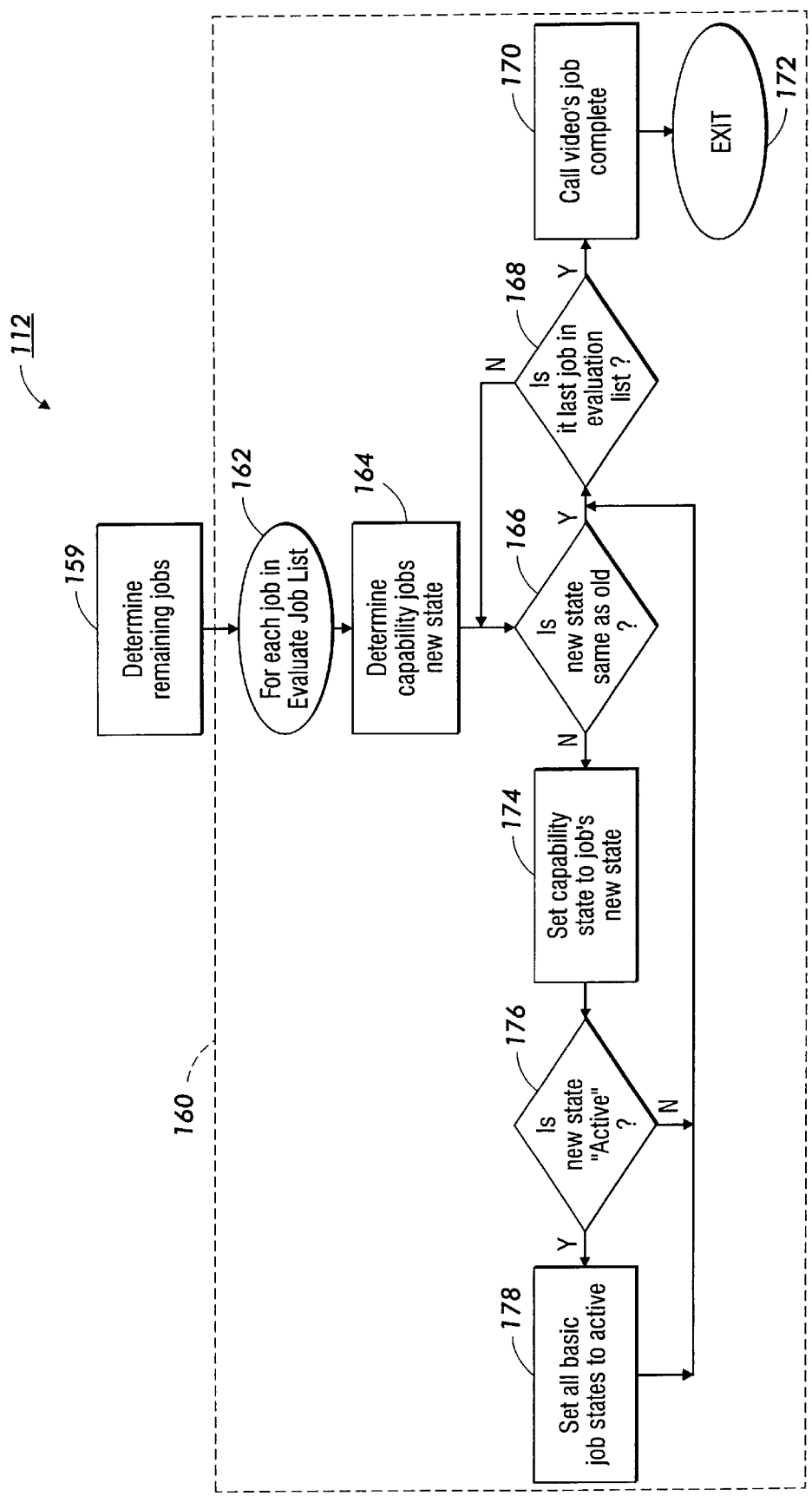

Referring now to FIGS. 10 and 11 the portion of the Job Contention Manager 112 associated with deleting a sub-job is shown. If the operator of the Multi Function Printer wishes to delete a job, he or she enter the delete or abort command at the External Job Service. The abort signal is fed to element 600 of the JCM 112 to determine if job is in a capability queue of the database 114. If it is not then element 602 causes the inquiry to terminate by exiting the JCM 112.

On the other hand if the aborting job is in the CR job queue then element 604 removes it from the Capability Resource job queue in the database 114. Element 606 then searches for each Basic Job Resource which was needed by the aborting CJR. The JCM 112 then walks through each such BR and removes the aborting sub-job from each respective BR job queue. This is accomplished by elements 148 through 158 of the JCM 112. Element 148 removes the aborting sub-job from each succeeding BR job queue. Upon removing a sub-job from a BR job queue it signals element 150 which decides if the deleted job is the top job in the respective BR job queue. If it was at the top of the queue then element 152 determines if there are any sub-jobs left in the respective queue. If there are sub-jobs remaining, then element 154 moves the next sub-job to the top of the queue. Element 154 then signals element 156 to delete the aborting sub-job from the BR job queue. If the aborting BR sub-job was not first in the queue then element 150 signals element 156 to delete the sub-job from BR job queue. If the aborting BR sub-job was first in the queue but there are no other jobs left in the queue then element 152 signals element 156 to delete the sub-job from the BR job queue. After the last BR sub-job for the aborting BJS sub-job is removed from the BR job queue of the database 115 a signal is sent by element 158 to the reset queues portion 160 of the JCM 112.

Referring to FIG. 11 the reset queues portion 160 of the JCM 112 is shown in greater detail. When the last basic resource of the aborting sub-job is deleted from the respective BR job queues then element 158 of the portion 159 of the JCM 112 which determines remaining jobs after a job is aborted, signals element 162 which identifies each sub-job in the CR job queue in database 114. Element 164 then determines the state of each of the sub-jobs in the CR job queue and signals element 166 which then determines if the new state is the same as the old. If it is, then element 168 determines if the sub-job is the last job in the CR job queue. If it is not the last job, then the JCM 112 walks through all the remaining sub-jobs in the CR job queue by sending a signal from element 168 back to element 166 to repeat the cycle. If it is the last job in the CR job queue then element 168 signals element 170 to call a "SubjobComplete" and exit at 172.

If element 166 determines that the new state is not the same as the old state then it signals element 174 which sets the CJR's state to the new state. Element 174 signals element 176 which determines if the new state is "bjsActive". If the new state is "bjsActive then element 178 sets all corresponding BJR states to "bjsActive". If element 178 sets all BJR states to "bjsActive" then it signals element 168 which determines if the sub-job is the last job in the CR job queue. If it is, element 170 is signaled to call "SubjobComplete" and exit at 172. If element 176 determines that the new state is not "bjsActive" then it signals element 168 which will recycle it since it is not the last item in the queue.

Figure 12:
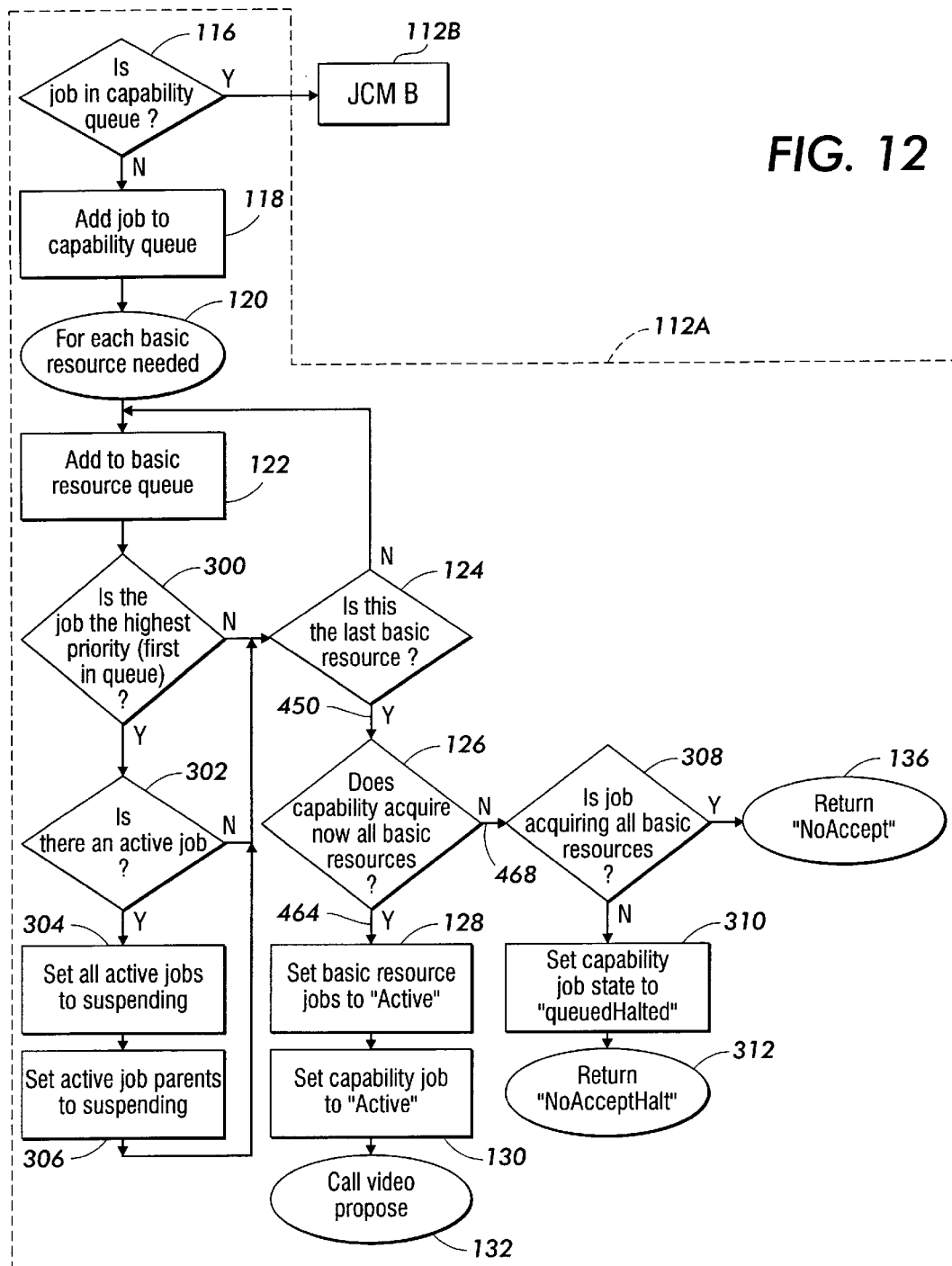
FIGS. 12, 13, and 14 comprise a schematic flow diagram depicting the manner in which jobs progress in a job based priority approach as a function of another preferred aspect of a contention management scheme embodied in the present invention FIG. 15 comprises a more detailed schematic flow diagram depicting the manner in which element 126 in FIGS. 9 and 12 carries out the multiple active capability approach of this invention.
Figure 13:
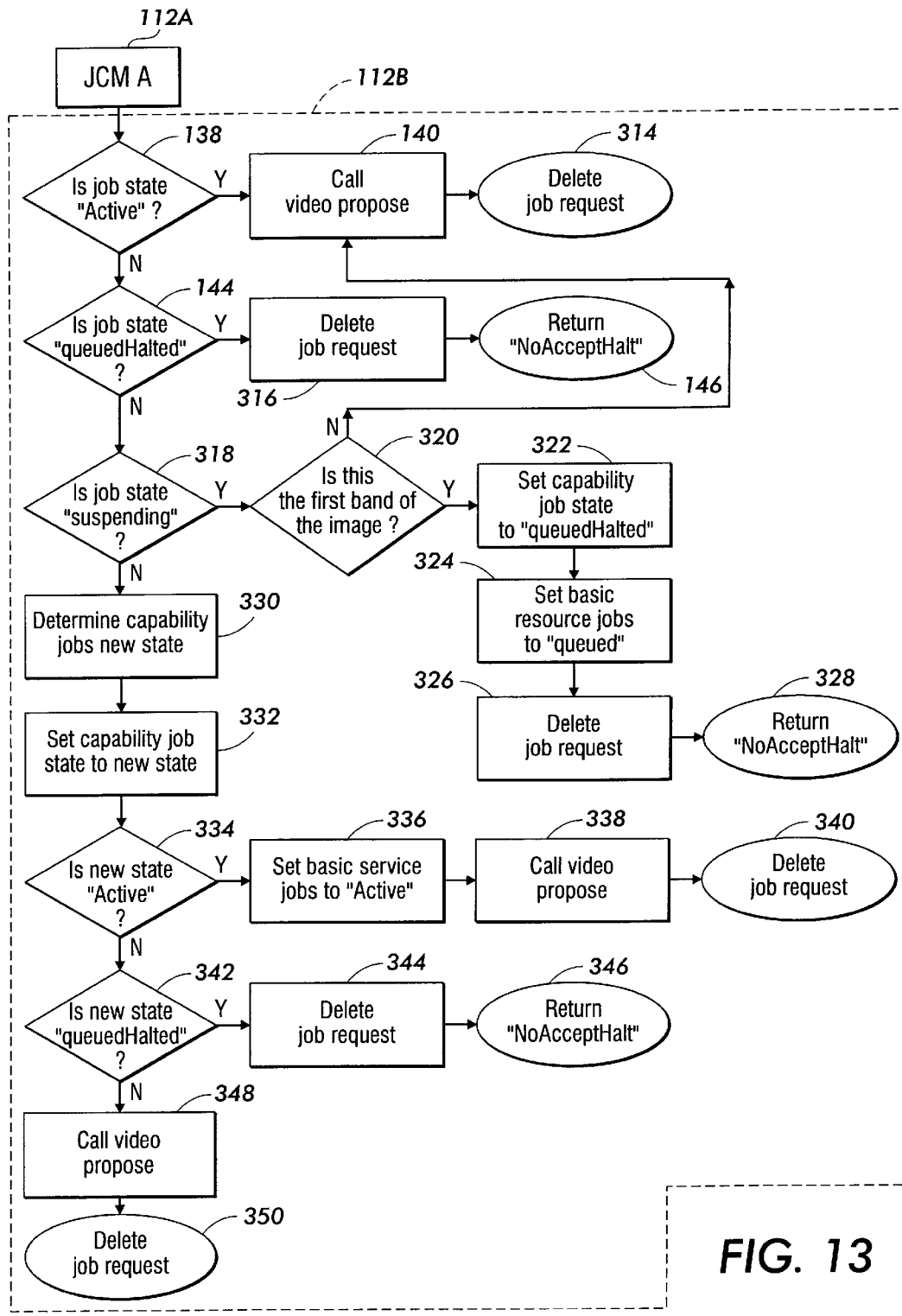

Referring now to FIGS. 12 and 13 the architecture of a preferred embodiment of the process and apparatus of this invention, for managing contention for a system's resources among multiple sub-jobs, using FIFO and/or job based priority will now be described in detail. In this preferred embodiment of the invention, access to resources is managed with a "Key Operator/System Administrator ("KO/SA") defined algorithm similar to that described in Salgado '681. With this algorithm, the KO/SA can arrange to have jobs defined according to job type, immediate walkup need, history of interruptions and other relevant factors. The algorithm can be configured to manage job contention in accordance with the desires of a typical printing system user. Since it is flexibly programmable, the algorithm can be made to accommodate for FIFO. In other words, FIFO is a subset of the capabilities of this algorithm. This invention prioritizes at the level of the basic resources thereby providing more efficient use of those resources.

Figure 14A:
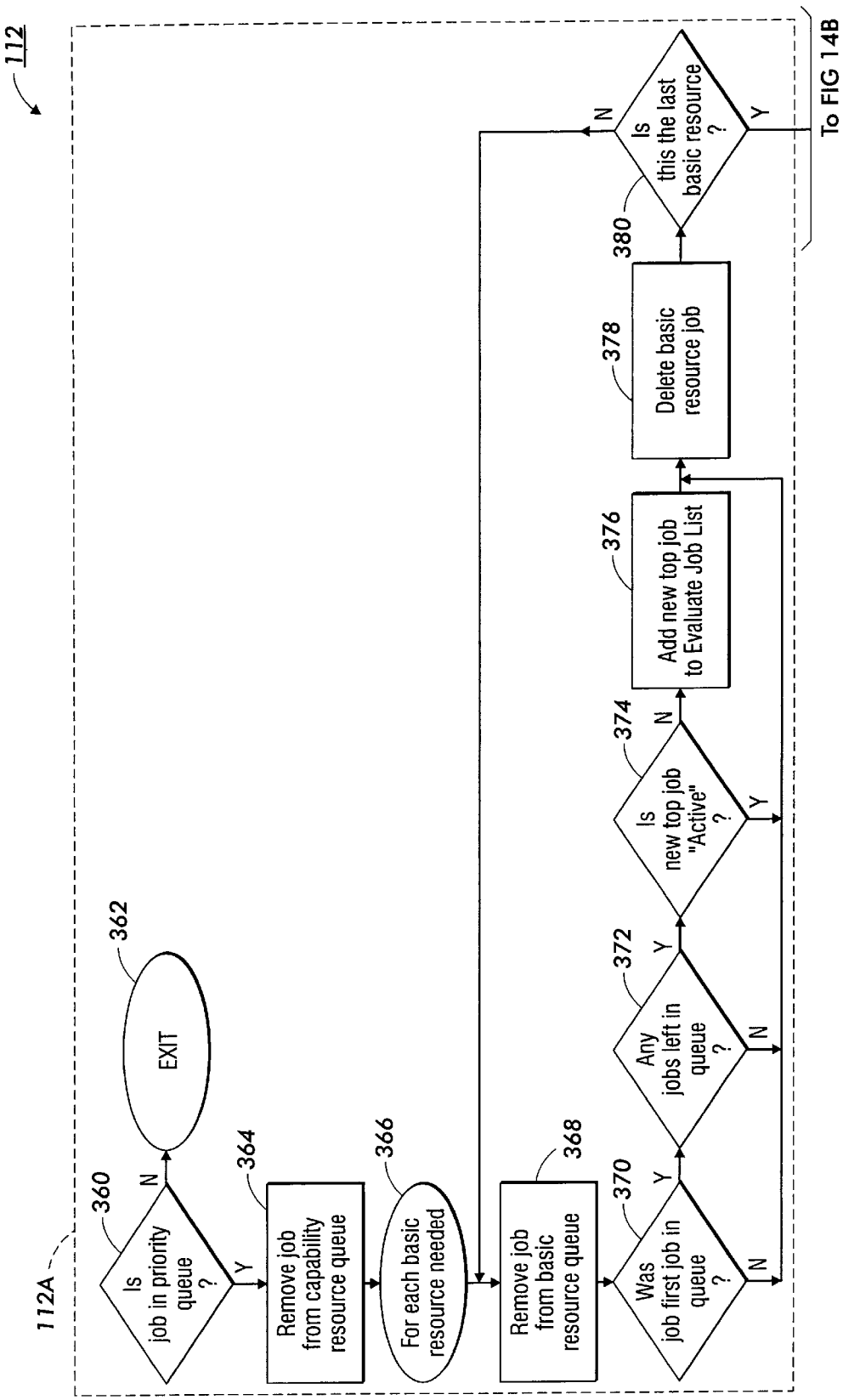
Figure 14B:
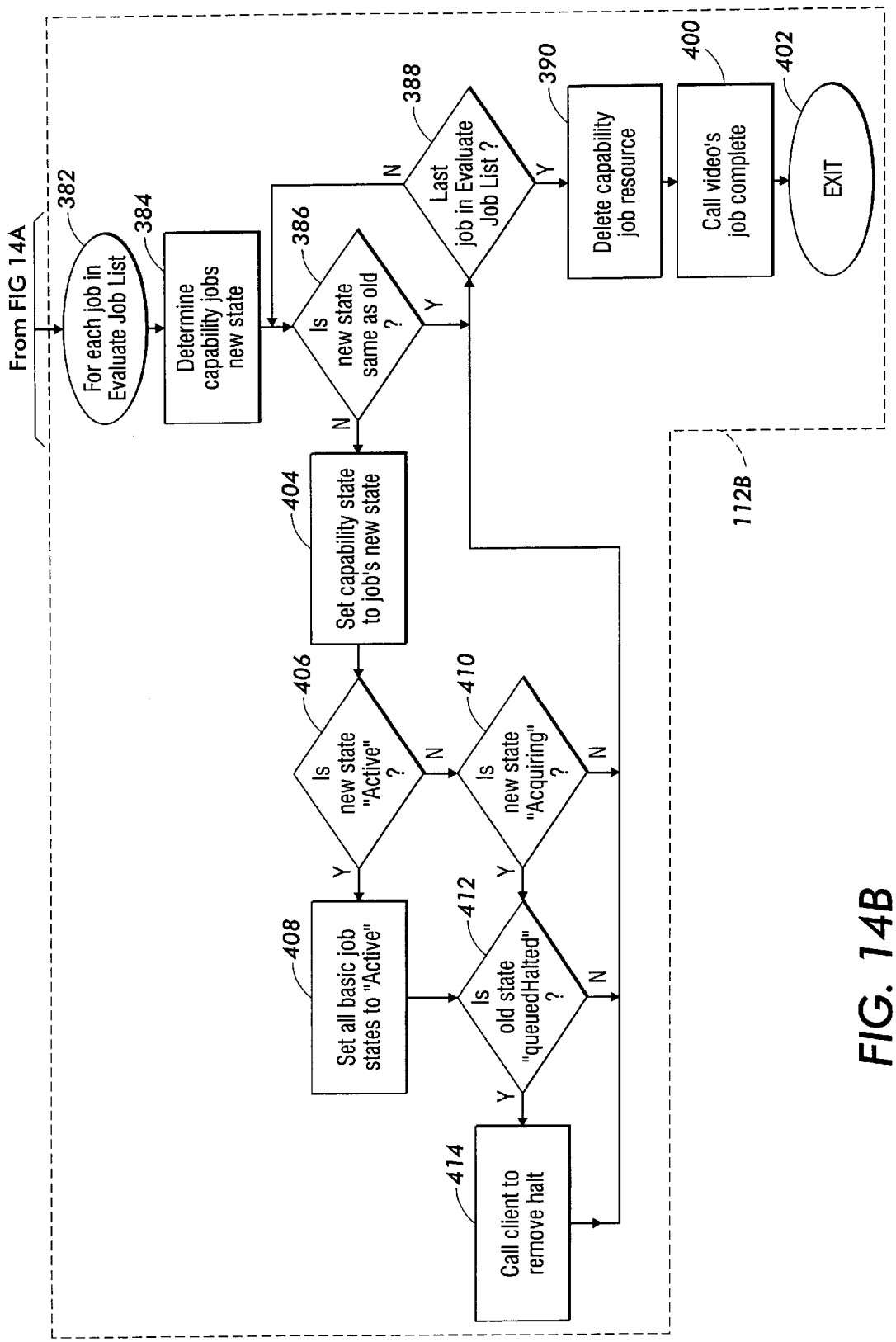

In FIGS. 12, 13 and 14 many common elements from the previously disclosed embodiment of FIGS. 9, 10 and 11 have been given corresponding reference numbers and have the same function as described heretofore. FIG. 12 shows the portion of the JCM 112A which deals with sub-jobs which are "Proposed" but are not already in the CR job queue.

Once again when a Basic Job Service 110 is ready to process a sub-job, the BJS 110 calls or signals the JCM 112A with an image "Propose" request as in FIG. 8 for each image it needs to process. The "Propose" request includes the job identifier, its priority information, the video capability required, and the requesting BJS identification. For example, the Scan BJS needs to scan a copy job (id: 3-1) form the DADH (document handler). For each image the scanner needs to input, the Scan BJS 110 calls the JCM 112 with a "Propose" (e.g. BJS service: Scan, job: 3-1, job priority: XXX, capability: ScanCompressed, . . . ).

Referring now to FIGS. 12 and 13 a job based priority version of a Job Contention Manager (JCM) 112 for managing contention for a system's resources among multiple sub-jobs is described. On the first request from a BJS 110 for a sub-job, the element 116 determines that the sub-job is not in a capability job service queue in the database 114 and signals element 118 to that effect. The JCM 112A then creates a Capability Job Resource (CJR) containing the above data. Element 118 adds the CJR to the CR's job list or queue in the database 114. The JCM 112A then walks or scans through the list of basic resources (see Table 2a and 2b), required for the CR, for each basic resource the CR needs. This is accomplished by cycling through elements 120, 122 124 and 300. For each basic resource the CR needs as determined by element 120 a Basic Job Resource (BJR) is created by element 122 and added to each basic resource's job list or queue in database 115.

New element 300 then determines if the sub-job is first in the queue of the BR, namely, the highest priority job. If it is not, it signals element 124. If element 300 determines that the relevant sub-job is first in the queue it signals element 302 which determines if there is a "bjsActive" job in the respective queue. If there is not such a "bjsActive" job then element 302 signals element 124. If element 302 determines that there is a "bjsActive" job in the respective queue then it signals element 304 to set all "bjsActive" jobs to "bjsSuspending" and notifies element 306 to set the CJR parent of the suspending BJR to "bjsSuspending". Element 306 then signals element 124. If the last component BJR has been added then element 124 signals element 126 which determines if the CJR has acquired all the BJR's it needs to carry out the sub-job.

Elements 300–306 serve to allow a higher priority job (as determined by the SA/KO algorithm) to suspend an active job until the higher priority job is completed. When a new sub-job request results in the need to suspend another sub-job's request, the JCM 112A sets the existing sub-job's CJR's state to "cjsSuspending". Upon the next Propose for the suspending sub-job, the JCM transitions the basic resources from the suspending sub-job to the acquiring sub-job. The BJS that Proposed for the suspending sub-job receives a "NoAccept" from the JCM 112A. When a BJS has completed its processing of a sub-job, it notifies the JCM 112 via a "Sub-jobCompleted". On receiving a "Sub-jobCompleted", the JCM 112 deletes the sub-job's information (CJRs and BJRs). For each BJR component used by the sub-job, the JCM 112 assigns the basic resource to the next sub-job in the BR's job queue (the state initially goes to 'bjsActive'). The JCM 112 then recalculates the state of these BJR's parent CJRs. If the BJS has Proposed for resources, the BJS also calls "Sub-jobCompleted" when the job is deleted by the user or terminated by the system.

At this point, the JCM 112A needs to determine the overall state of the BJS' "Propose" request (in this invention, it is the state of the CJR). If all its component BJR's are "bjsActive" as determined by element 126 then element 128 sets all BJR's states to "bjsActive". Element 130 then sets the CJR's state to "cjsActive". The JCM 112A at 132 then forwards the BJS Propose to the component basic services (Video 111) for processing. Video 111 processes the request as normal and sends an Accept to the BJS via the JCM.

As noted above for each added BJR, the JCM 112 determines the state of the Basic Job Resource. If the BJR is the highest priority job within the basic resource's job list (top of the queue), the state is "bjsActive" if no other "bjsActive" BJR is in the list. If there is another "bjsActive" BJR, then the added Basic Job Resource's state is "bjsAcquiring". If the added Basic Job Resource is not at the top of the queue, then the state is "bjsQueued". If the BJS' component BJRs have a combination of "bjsActive" and "bjsAcquiring" states, the CJR's state is "cjsAcquiring". Otherwise, the CJR's state is "cjsQueued". The JCM 112 then updates all of the CJR's respective BJRs to reflect the overall state. In other words, if the Capability Job Resource's (CJR's) state is "cjsQueued", all component Basic Job Resource's (BJR's) states are set to "bjsQueued".

As described above to enable capability resource streaming in accordance with this invention the JCM 112 can have multiply active capability job resources for a basic resource (BR) under a specific condition. Therefore, a BJS service can "Propose" for multiple capability resources. The JCM follows its normal algorithm and sets up a CJR and component BJR's for the sub-job. The CJR and BJR's are placed in their corresponding sub-job queues for this subjob. However, in accordance with this invention the determination of whether a new BJR sub-job is "bjsActive" may be based on determining that the BJR sub-job prior to the new BJR sub-job is "bjsActive" and that both BJR sub-jobs were submitted by the same basic job service and for the same job. In other words, if the next BJR is submitted by the same service and for the same job as the BJR above it, it acquires the state of the BJR above it. Therefore two or more CJRs can achieve a "bjsActive" state if they meet the aforenoted conditions and thereby allow the BJS to "Propose" for multiple capability resources.

Referring again to FIG. 15 element 126 is shown in greater detail in order to illustrate how multiple capability resources can be streamed in accordance with a preferred embodiment of this invention. The signal 450 from element 124 is coupled to element 452. For each basic resource needed by a sub-job an index 454 is set at 0. For each sub-job in a BR queue element 456 signals index 458 to increment by 1. Element 460 then determines if the sub-job at the index position of element 458 is the new sub-job. If it is, then element 462 determines if the index position is 1, which is the top job in the BR queue. If it is, then signal 464 is coupled to element 128. Then as described above element 128 sets all BJR's states to "bjsActive". Element 130 then sets the CJR's state to "cjsActive". The JCM 112 at 132 then forwards the BJS Propose to the component basic services (Video 111) for processing. Video 111 processes the request as normal and sends an Accept 135 to the BJS via the JCM.

If element 462 determines that the index position is not 1, then it signals element 466, which determines if the new sub-job is from the same service and for the same job as the $1^{st}$ sub-job. If the new sub-job is from the same service and job, element 466 provides a signal 464 to element 128. Then as described above element 128 sets all of the new sub-job's BJR states to "bjsActive". Element 130 then sets the CJR's state to "cjsActive". The JCM 112 at 132 then forwards the BJS Propose to the component basic services (Video 111) for processing immediately after the prior "bjsActive" sub-job submitted by the same service and for the same job. Video 111 processes the request in a capability resource streaming sequence, and sends an Accept 135 to the BJS via the JCM. If element 466 determines that the new sub-job is not from the same service and job as the first sub-job in the BJR queue then it forwards signal 468 to element 308 to determine if the sub-job is acquiring all its component basic resources.

If element 460 determines that the sub-job at the index position of 458 is not the new sub-job, then element 470 determines if the index position of element 458 is equal to 1. If it is, then element 470 recycles the sub-job to element 458 which increases the index position by 1. If the index 458 does not equal 1 then element 470 signals element 472, which determines if the sub-job is from the same service and job as the 1$^{st}$ sub-job. If it is, then element 472 recycles the sub-job to the index 458 until the index 458 reaches the position of the new sub-job. If the sub-job is not from the same service and job as the 1$^{st}$ sub-job, then element 472 forwards a signal 468 to element 308 to determine if the sub-job is acquiring all its component basic resources.

If element 126 determines that the BJRs for a new sub-job immediately follow prior BJRs in their queues which are "bjsActive", and if it determines that the BJRs were submitted by the same BJS and for the same sub-job as the top job in the queue, then element 128 sets the new job's BJRs to "bjsActive" and then element 130 sets the corresponding CJR to "cjsActive" and the JCM 112 at 132 then forwards the BJS Propose to the component basic services (Video 111) for processing immediately after the prior sub-job in the queue. Video 111 processes the request as normal and sends an Accept 460 to the BJS via the JCM.

If the element 126 determines that the CJR has not acquired all the BJR's it needs since its state is "cjsAcquiring" or cjsQueued" it forwards signal 468 to element 308 which determines if the sub-job is acquiring all the basic resources it needs. If it determines that the CJR is not acquiring all the BJR's it needs then element 310 sets the CJR to "bjsQueuedHalted" and the JCM 112A returns a "NoAcceptHalt" 312 to the proposing BJS. If element 308 determines that the CJR's state is "bjsAcquiring" it signals element 136 to return a "NoAccept" to the BJS. As in the previous embodiment the BJS after receiving a "No Accept" will propose again at a later time based on a timing signal.

If element 116 of FIG. 12 determines that the sub-job is already in the CR queue then part A of the JCM 112 signals element 138 in part B of JCM 112 which determines if the job state of the CJR is "cjsActive". If it is, it notifies element 140 and the JCM 112B then forwards the BJS Propose to the component basic services (Video 111) for processing. Video 111 processes the request as normal and sends an Accept to the BJS via the JCM. The BJS sends a Sub-jobComplete to the JCM which deletes the sub-job from the BR and CR job queues at 314. On the other hand if element 138 determines that the job state of the CJR is not active then it signals element 144 which determines if the sub-job state is "cjsQueuedHalted". If it is, then element 144 signals element 316 to delete the sub-job request and element 146 returns a "NoAcceptHalt".

If element 144 determines that the job state is not "cjsQueuedHalted" it signals element 318 which determines if the job state is "cjsSuspending". If it is, it signals element 320 which determines if it is the first band of the image. If it is not the first band of the image then element 320 signals element 140 and the JCM 112B then forwards the BJS Propose to the component basic services (Video 111) for processing. Video 111 processes the request as normal and sends an Accept to the BJS via the JCM. The BJS sends a "Sub-jobComplete" to the JCM, which deletes the sub-job from the BR and CR job queues at 314. On the other hand if element 138 determines that the job state of the CJR is not "cjsActive" then it signals element 144 which determines if the sub-job state is "cjsQueued".

If element 320 determines that the sub-job is the first band of the image then it signals element 322 to set the CJR state to "cjsQueuedHalted" which in turn causes element 324 to set the component BJR's to "bjsQueued". Element 326 then deletes the job request and the JCM returns a "NoAcceptHalt" at 328 to the BJS.

If element 318 determines that the sub-job is not suspending it notifies element 330 which determines the CJR's new state. Element 332 then sets the CJR to the new state which is forwarded to element 334 which determines if the new state is "cjsActive". If it is, then element 336 sets the component BJR's to "bjsActive". The JCM 112B at 338 then forwards the BJS' Propose to the component basic services (Video 111) for processing. Video 111 processes the request as normal and sends an Accept to the BJS 110 via the JCM. Upon completion of the sub-job the BJS 110 signals the JCM, "Sub-jobComplete" and element 340 deletes the job request from the CR and BR job queues.

If element 334 determines that the new state is not "cjsActive" it notifies element 342 which determines if the new state is "cjsQueuedHalted". If it is, then element 344 deletes the job request and the JCM 112B returns a "NoAcceptHalt" to the BJS 110 at element 346. If the new state is not "cjsQueuedHalted" then element 342 notifies element 348 which then forwards the BJS' "Propose" to the component basic services (Video 111) for processing. Video 111 processes the request as normal and sends an Accept to the BJS 110 via the JCM 112. Upon completion of the sub-job the BJS 110 signals the JCM "Sub-jobComplete" and element 350 deletes the job request from the CR and BR job queues.

Referring now to FIG. 14 the portion of the Job Contention Manager 112 associated with deleting a sub-job in the job based priority alternative is shown. If the operator of the Multi-Function Printer wishes to delete a job, he or she enters the delete or abort command at the External Job Service. The abort signal is fed to element 360 of the JCM 112 to determine if the job is in a CR job queue of the database 114. If it is not, then element 362 causes the inquiry to terminate by exiting the JCM 112.

On the other hand if the aborting job is in the CR job queue then element 364 removes it from the Capability Resource queue in the database 114. Element 366 then searches for each Basic Job Resource which was needed by the aborting CJR. The JCM 112 then walks through each such BJR and removes the aborting sub-job from each respective BR job queue. This is accomplished by elements 368 through 380 of the JCM 112. Element 368 removes the aborting sub-job from each succeeding BR job queue. Upon removing a sub-job from a BR job queue it signals element 370 which decides if the deleted job is the top job in the respective BR job queue. If it was at the top of the queue, then element 372 determines if there are any sub-jobs left in the respective queue. If there are sub-jobs remaining, then element 374 determines if the new top job is "bjsActive". If it is not, then element 376 moves the next sub-job to the top of the queue. Element 376 then signals element 378 to delete the aborting sub-job from the BR job queue.

If the aborting BJR sub-job was not first in the queue, then element 370 signals element 378 to delete the sub-job from BR job queue. If the aborting BJR sub-job was first in the queue but there are no other jobs left in the queue, then element 372 signals element 378 to delete the sub-job from the BR job queue. If the aborting BJR sub-job was first in the queue and there are other sub-jobs left in the queue and element 374 determines that the new top sub-job is "bjsActive", then it signals element 378 to delete the aborting sub-job from the BR job queue.

After the last BJR sub-job for the aborting BJS sub-job is removed from the BR job queue of the database 115 a signal is sent by element 380 to the reset queues portion 112B of the JCM 112. When the last basic resource of the aborting sub-job is deleted from the respective BR job queues then element 380 of the portion 112A of the JCM 112 signals element 382 which identifies each sub-job remaining in the CR job queue in database 114. Element 384 then determines the state of each of the sub-jobs in the CR job queue and signals element 386, which then determines if the new state is the same as the old. If it is, then element 388 determines if the sub-job is the last job in the CR job queue. If it is not the last job, then the JCM 112 walks through all the remaining sub-jobs in the CR job queue by sending a signal from element 388 back to element 386 to repeat the cycle. If it is the last job in the CR job queue, then element 388 signals element 390 to delete the CJR. Element 400 then calls a "SubjobComplete" and exits the JCM at 402.

If element 386 determines that the new state is not the same as the old state then it signals element 404 which sets the CJR's state to the new state. Element 404 signals element 406 which determines if the new state is "cjsActive". If the new state is "cjsActive then element 408 sets all basic job states to "bjsActive". If the new state is not "cjsActive" then element 410 determines if the new state is "cjsAcquiring". If it is then element 412 determines if the old state of the CJR was "cjsQueuedHalted". If it was, then element 414 calls the client to remove the halt (i.e. Propose again). If element 408 sets all BJR states to "bjsActive" then it signals element 412 which determines if the old state was "bjsQueuedHalted". If it was, then element 414 calls the client to remove the halt (i.e. Propose again).

Element 414 or element 412 if the old state is not "cjsQueuedHalted" or element 410 if the new state is not "cjsAcquiring" signal element 388 which determines if the sub-job is the last job in the CR job queue. If it is not the last job, then the JCM 112 walks through all the remaining sub-jobs in the CR job queue by sending a signal from element 388 back to element 386 to repeat the cycle. If it is the last job in the CR job queue then element 388 signals element 390 to delete the CJR. Element 400 then calls a "Sub-jobComplete" and then exits the JCM at 402.

The method and apparatus for prioritizing the use of a Multi-Functional Printer may employ any desired number of capabilities. Those set forth above are only by way of example. The following table illustrates by way of a further example a wider range of capabilities than heretofore described which could be employed, however, additional capabilities as desired could also be employed.

TABLE 3

| CAPABILITY RESOURCES | Capabilities | | | | |
|---|---|---|---|---|---|
| | BASIC JOB RESOURCES | | | | |
| EssBandRes-Conversion | compressor | Loopback channel | IPS1 | | |
| EssBandNoRes-Conversion | compressor | Loopback channel | | | |
| EssBand-BusGate | compressor | Loopback channel | | | |

TABLE 3-continued

| CAPABILITY RESOURCES | Capabilities | | | | |
|---|---|---|---|---|---|
| | BASIC JOB RESOURCES | | | | |
| IIInternalImage FirstOriginal | Input channel | IPS1 | | | |
| IIInternalImage | Input channel | IPS1 | | | |
| IInullImage | Input channel | IPS1 | | | |
| IPBlankImage | compressor | decompressor | Input channel | Output channel | Loopback channel |
| IPCompression | compressor | decompressor | Input channel | Output channel | Loopback channel |
| IPDecompression | compressor | decompressor | Input channel | Output channel | Loopback channel |
| IPImageRepeat | compressor | decompressor | Input channel | Output channel | Loopback channel |
| IPNUpImage | compressor | decompressor | Input channel | Output channel | Loopback channel |
| IPRotation | compressor | decompressor | Input channel | Output channel | Loopback channel |
| IPCreateText | compressor | decompressor | Input channel | Output channel | Loopback channel |
| IPDiskText | compressor | decompressor | Input channel | Output channel | Loopback channel |
| IPAnnotation | compressor | decompressor | Input channel | Output channel | Loopback channel |
| PGOriginal | decompressor | Output channel | | | |
| ScanOriginal | compressor | Input channel | IPS1 | | |
| PreScan | | | IPS1 | | |
| ScanToFile | Output channel | | | | |
| MarkOutput | decompressor | Output channel | | | |

The method and apparatus for prioritizing the use of a Multi-Functional Printer of this invention provides a significant improvement over the prior art approaches by extending the queuing process down to the level of the basic resources for carrying out the subjob. This allows basic resources to be reallocated to other sub-jobs as soon as the basic resource is available rather than having to wait for a basic job service to complete its operation as in previous machines. For an MFP with shared basic resources this provides better thruput since the basic shared video resources of the printer can carry out multiple sub-jobs when there is no contention at the level of the basic resources.

This invention is particularly useful for providing capability resource streaming for video resources which enables processing of a sub-job with multiply active capability job resources for a basic resource if it is from the same service and for the same job as the currently active basic job resource.

In order to better illustrate the improved performance of the present invention the following example is provided. The contention algorithm is "priority based". In this example, copy jobs have a priority 8 and testPatternPrint jobs have a priority 5. Thus, copy jobs are higher priority than testPatternPrint jobs. Note: jobs can begin outputting after 4 images have inputted.

The user programs a copy job such that every other page is rotated. The Copy Job 1, having a priority 8, is entered at the EJS. The Basic Job Service divides the Copy Job 1 into Scan, Image Processing, and Marking sub-jobs. The Scan Service requires the "ScanOriginal" capability that uses the Compressor, IPS1, and Input Channel basic resources. The Image Processing Service requires the "IPBlankImage" and "IPRotatation" capabilities that use the compressor, decompressor, input channel, output channel, and loopback channel. The Mark service requires the "MarkOutput" capability that uses the Output Channel and Decompressor basic resources. The BJS 110 sends the JCM 112 a "Propose" for the scan sub-job CJ1 for capability "ScanOriginal". The JCM 112 enters the CJ1 sub-job in the =ScanOriginal" CR job queue as the top job.

| CAPABILITY RESOURCE | SCAN-ORIGINAL |
|---|---|
| QUEUE POSITION 1 | Job: CJ1 Service: scan |
| QUEUE POSITION 2 | |
| QUEUE POSITION 3 | |

While only three queue positions are shown in this example the data base 114 may have any desired number of queue positions.

The JCM 112 then enters the scan service's CJ1 sub-job in the Compressor, IPS1 and Input Channel BR job queues.

| BASIC JOB RESOURCE | COM-PRESSOR | INPUT CHANNEL | IPS1 |
|---|---|---|---|
| QUEUE POSITION 1 | Job: CJ1 Service: scan Capability: ScanOriginal State: active | Job: CJ1 Service: scan Capability: ScanOriginal State: active | Job: CJ1 Service: scan Capability: ScanOriginal State: active |
| QUEUE POSITION 2 | | | |
| QUEUE POSITION 3 | | | |

Next a test pattern print job TJ1 is entered at the EJS, having a priority of 5. The Basic Job Service divides the Test Pattern Print Job 1 into Internal Image Gen and Mark sub-jobs. The Internal Image Gen Service requires the IIInternalImage capability that uses the IPS1 and Input Channel basic resources. The Mark Service requires the "MarkOutput" capability that uses the Output Channel and Decompressor basic resources. The BJS 110 sends the JCM 112 a "Propose" for the internal image gen sub-job TJ1 for the capability "IIInternalImage". The JCM 112 enters the TJ1 sub-job in the IIInternalImage CR job queue.

| CAPABILITY RESOURCE | SCAN-ORIGINAL | IIINTERNAL-IMAGE |
|---|---|---|
| QUEUE POSITION 1 | Job: CJ1 Service: scan | Job: TJ1 Service: internal image gen |
| QUEUE POSITION 2 | | |
| QUEUE POSITION 3 | | |

The JCM 112 then enters the TJ1 sub-job in the BR IPS1 and Input Channel queues as the second in line since the TP1 job is lower priority than CJ1.

| BASIC JOB RESOURCE | COM-PRESSOR | INPUT CHANNEL | IPS1 |
|---|---|---|---|
| QUEUE POSITION 1 | Job: CJ1 Service: scan Capability: ScanOriginal State: active | Job: CJ1 Service: scan Capability: ScanOriginal State: active | Job: CJ1 Service: scan Capability: ScanOriginal State: active |
| QUEUE POSITION 2 | | Job: TJ1 Service: internal image gen Capability: IIInternalImage State: queuedHalted | Job: TJ1 Service: internal image gen Capability: IIInternalImage State: queuedHalted |
| QUEUE POSITION 3 | | | |

At this point CJ1 since it is first in the queue has a cjsActive state and an Accept is sent to video 111 to process the CJ1 sub-job. The TJ1 job has a cjsQueuedHalted state and a NoAcceptHalt is sent to the BJS. As soon as the scan sub-job CJ1 is completed the BJS forwards a SubjobComplete to the JCM 112 which removes CJ1 from the CR and BR job queues. As soon as this occurs the internal image gen sub-job TJ1 state is changed from bjsQueuedHalted to bjsActive at both the CJR and BJR levels. The JCM 112 notifies the BJR to remove the halt and the BJS forwards a Propose to the JCM which sends back an Accept so that the TJ1 sub-job is generated.

| CAPABILITY RESOURCE | IIINTERNAL-IMAGE |
|---|---|
| QUEUE POSITION 1 | Job: TJ1 Service: internal image gen |
| QUEUE POSITION 2 | |
| QUEUE POSITION 3 | |

| BASIC RESOURCE | INPUT CHANNEL | IPS1 |
|---|---|---|
| QUEUE POSITION 1 | Job: TJ1 Service: internal image gen Capability: IIInternalImage State: active | Job: TJ1 Service: internal image gen Capability: IIInternalImage State: active |
| QUEUE POSITION 2 | | |
| QUEUE POSITION 3 | | |

Since Copy Job 1 is scanned, image processing can begin. Image Processing BJS 110 sends the JCM 112 a "Propose" for the image processing sub-job CJ1 using the "ipBlankImage" capability. The JCM 112 enters the CJ1 sub-job in the "IPBlankImage" CR job queue.

| CAPABILITY RESOURCE | IPBLANK-IMAGE | IIINTERNAL-IMAGE |
|---|---|---|
| QUEUE POSITION 1 | Job: CJ1 Service: image processing | Job: TJ1 Service: internal image gen |
| QUEUE POSITION 2 | | |
| QUEUE POSITION 3 | | |

The JCM 112 then enters the CJ1 sub-job in the BR compressor, decompressor, input channel, output channel, and loopback channel job queues. Since CJ1 is higher priority than TJ1, the CJ1 sub-job is placed ahead of the TJ1 sub-job and the TJ1 sub-jobs are set to suspending.

To continue processing the CJ1 job, the Image Processing Service requires the use of the "IPRotation" capability. The Image Processing Service sends a Propose for the "IPRotation" capability on CJ1 to the JCM. The JCM adds the CJ1 job to the "IPRotation" capability queue.

| CAPABILITY RESOURCE | IPBLANK-IMAGE | IPROTATION | IIINTERNAL-IMAGE |
|---|---|---|---|
| QUEUE POSITION 1 | Job: CJ1 Service: image processing | Job: CJ1 Service: image processing | Job: TJ1 Service: internal image gen |
| QUEUE POSITION 2 | | | |
| QUEUE POSITION 3 | | | |

| BR | INPUT CHANNEL | IPS1 | COMPRESSOR | DE-COMPRESSOR | LOOPBACK CHANNEL | OUTPUT CHANNEL |
|---|---|---|---|---|---|---|
| Q 1 | Job: CJ1 Service: image processing Capability: IpBlankImage State: queued | Job: TJ1 Service: internal image gen Capability: IIInternal-Image State: suspending | Job: CJ1 Service: image processing Capability: IPBlankImage State: queued | Job: CJ1 Service: image processing Capability: IPBlankImage State: queued | Job: CJ1 Service: image processing Capability: IPBlankImage State: queued | Job: CJ1 Service: image processing Capability: IPBlank-Image State: queued |
| Q 2 | Job: TJ1 Service: internal image gen Capability: IIInternalImage State: suspending | | | | | |
| Q 3 | | | | | | |

The next time the Internal Image Service proposes for the TJ1 sub-job, the TJ1 sub-jobs are set to 'queuedHalted' and the CJ1 is set to 'active'. When Image Processing Service proposes for CJ1 (after the time has elapsed), the JCM accepts the Propose.

The JCM 112 then enters the CJ1 sub-job for capability "IPRotation" in the BR compressor, decompressor, input channel, output channel, and loopback channel job queues. Based on priority, this job is placed between the existing 2 sub-jobs. With this invention, the state of this new sub-job

| BR | INPUT CHANNEL | IPS1 | COMPRESSOR | DE-COMPRESSOR | LOOPBACK CHANNEL | OUTPUT CHANNEL |
|---|---|---|---|---|---|---|
| Q 1 | Job: CJ1 Service: image processing Capability: IPBlankImage State: active | Job: TJ1 Service: internal image gen Capability: IIInternalImage State: queuedHalted | Job: CJ1 Service: image processing Capability: IPBlankImage State: active | Job: CJ1 Service: image processing Capability: IPBlankImage State: active | Job: CJ1 Service: image processing Capability: IPBlankImage State: active | Job: CJ1 Service: image processing Capability: PBlankImage State: active |
| Q 2 | Job:TJ1 Service: internal image gen Capability: IIInternalImage State: queuedHalted | | | | | |
| Q 3 | | | | | | | is active since it is from the same service (Image Processing) and for the same job (CJ1) as the active sub-job. In prior concepts, a BJS would not have been allowed to use 2 different capabilities to process a job.

just abbreviations for the capability's descriptive name. Some of the names may not be as intuitive as others, and therefore in Table 4 there are provided brief descriptions of the capabilities of Table 3.

| BR | INPUT CHANNEL | IPS1 | COMPRESSOR | DE-COMPRESSOR | LOOPBACK CHANNEL | OUTPUT CHANNEL |
|---|---|---|---|---|---|---|
| Q 1 | Job: CJ1 Service: image processing Capability: IPBlankImage State: active | Job: TJ1 Service: internal image gen Capability: IIInternal-Image State: queuedHalted | Job: CJ1 Service: image processing Capability: IPBlankImage State: active | Job: CJ1 Service: image processing Capability: IPBlankImage State: active | Job: CJ1 Service: image processing Capability: IPBlankImage State: active | Job: CJ1 Service: image processing Capability: IPBlankImage State: active |
| Q 2 | Job: CJ1 Service: image processing Capability: IPRotation State: active | | Job: CJ1 Service: image processing Capability: IPRotation State: active | Job: CJ1 Service: image processing Capability: IPRotation State: active | Job: CJ1 Service: image processing Capability: IPRotation State: active | Job: CJ1 Service: image processing Capability: IPRotation State: active |
| Q 3 | Job:TJ1 Service: internal image gen Capability: IIInternalImage State: queuedHalted | | | | | |

In accordance with this invention the second sub-job submitted by the same service and for the same sub-job must be in consecutive order in the queue with the first sub-job so that there are no other active sub-jobs between them.

The aforenoted algorithms as embodied in FIGS. 8–15 can be carried out by any desired computer processing and MFP hardware which includes software to carry out the functions as described in these Figures.

While the invention has been described with respect to two levels of queued resources, namely, CRs and BRs, it may include any desired number of levels of queued resources and corresponding data base levels. For example, it may be possible to further break down the BRs into a sub BR level or levels in an effort to gain increased productivity.

The terms Propose, Accept, NoAccept, NoAcceptHalt, SubJobComplete, Image Complete, as used herein generally refer to a signal or software request or software notification and the terms Active, Queued, queuedHalted, suspending, refer to states of a sub-job or a propose. These terms are used in a generic sense and other terms could be used in their place as desired as a name for their function and use.

The term ESS as used herein refers to an electronic subsystem used for network connectivity and decomposition of images. The term SCS as used herein refers to the strategic control system which is the digital copier control platform. They are part of the electronic control system of the MFP.

The names used for capabilities in Table 3 are provided for convenience and any desired name could be used as the name of a capability. Generally the capabilities in Table 3 are

TABLE 4

| CAPABILITY RESOURCES | Description |
|---|---|
| EssBandRes-Conversion | Transfer of network image that requires the resolution to be modified. |
| EssBandNoRes-Conversion | Transfer of network image that doesn't require resolution modification. |
| EssBand-BusGate | Transfer of a network image (without compressing image). |
| IIInternalImage-FirstOriginal | Prepare for generation of test pattern images. |
| IIInternalImage | Generate test pattern images. |
| IInullImage | Generate a blank test pattern. |
| IPBlankImage | Generate a white image. |
| IPCompression | Compress an image. |
| IPDecompression | Decompress an image. |
| IPImageRepeat | Produce a m x n pattern of a single image. |
| IPNUpImage | Produce a m x n pattern of mn images. |
| IPRotation | Rotate image. |
| IPCreateText | Add text to an image in memory. |
| IPDiskText | Add text to an image on disk. |
| IPAnnotation | Annotate 2 images together. |
| PGOriginal | Create an image from text. |
| ScanOriginal | Scan an original into EPC. |
| PreScan | Pre-scan an original. |
| ScanToFile | Transfer an image to the ESS for sending across the network. |
| MarkOutput | Mark an image. |

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A method for prioritizing the use of multifunctional printing system's basic processing resources to enable a job service to process a sub-job for multiple video capabilities coordinated by a video control module, said system employing a controller with a job contention manager (JCM), said method comprising:

a) providing a plurality of basic resources of the printing system with each of said basic resources having a job queue;

b) one or more job services, at a desired time, sending a signal to said JCM to carry out a sub-job of a given job, said signal, for each of said sub-jobs, including information about the respective sub-job and its job service and priority;

c) responsive to said signal, said JCM adding, for a first video capability coordinated by the video control module and required by a first sub-job, a corresponding first basic job resource to the queues of each basic resource which said first video capability will require in order to perform said first sub-job;

d) placing said first basic job resources for said first sub-job in an "Active" state ready for processing, if said first basic job resources for said first sub-job are at the top of all of the queues, of all the basic resources, required by said first video capability;

e) responsive to said signal, said JCM adding, for a second. video capability coordinated by the video control module and required by said first sub-job, a corresponding second basic job resource sub-job to the queues of each basic resource which said second video capability will require in order to perform said first sub-job; and f) placing said second basic job resources, which follow said first basic job resource in a basic resource queue, in an "Active" state ready for processing after said first basic job resource, if the first and second basic job resources in said queue are submitted by the same job service and if the second basic job resource is for the same sub-job as the first basic job resource's sub-job.

2. A method as in claim 1 wherein, said sub-jobs are placed in said queues of said basic resources in the order of their priority.

3. A method as in claim 1 wherein, said signal for said first sub-job comprises a first sub-job "Propose" for said first video capability from said job service to the JCM and wherein said JCM determines the state of the first basic job resource for said sub-job upon receiving the "Propose", such that if the first basic job resource for said sub-job is at the top of all the basic resource job queues its state is "Active" and if said state is "Active" said JCM forwards an "Accept" to said job service so that said first sub-job is performed.

4. A method as in claim 3 wherein, said signal for said first sub-job comprises a second sub-job "Propose" for said second video capability from said job service to the JCM and wherein said JCM determines the state of the second basic job resource for said first sub-job upon receiving the "Propose", such that if the second basic job resource for said sub-job follows said first basic job resource and was proposed by the same job service for the same sub-job, then its state is "Active" and if said state is "Active" said JCM forwards an "Accept" to said job service so that said second basic job resource is performed after said first basic job resource is finished.

5. A method as in claim 4 wherein, prior to step (f) said JCM determines upon receiving the "Propose" for said second video capability, if such second basic job resource is next in a basic resource job queue after said first basic job resource and if it was proposed for the same sub-job by the same job service as proposed the first basic job resource, and following said step (f) said JCM forwards an "Accept" to said job service so that said second sub-job is performed upon the completion of the first sub-job.

6. A resource based method of managing the processing of a plurality of jobs in a multifunctional printing system in which at least one job is inputted for processing at one or more job services, said system including a controller with a job contention manager (JCM) for prioritizing the use of the printing system's basic processing resources, said method comprising:

a) including in at least a first level of a database a plurality of capability resources associated with sub-job is of said one or more job services and including in at least a second level of said database a plurality of basic resources of the printing system, with each capability resource containing a list of the basic resources it needs to carry out its capability and each basic resource containing a list of the capability resources that depend upon it;

b) each capability resource and each basic resource including a sub-job queue;

c) each respective job service, at a desired time, sending a signal to said JCM to carry out a sub-job of said at least one job, said signal for each of said sub-jobs including information about the respective sub-job and its job service and priority;

d) responsive to step (c), said JCM creating for said at least one sub-job received from said job service, respective capability job resources containing said information, and adding each such capability job resource, based on priority, to the respective capability resource, job queue;

e) responsive to step (d) said JCM adding, for each capability job resource, component basic job resources to the queues of each basic resource which a respective capability resource will require;

f) placing first basic job resources, which are components of a first capability resource, for said at least one sub-job, in an "Active" state ready for processing, if said first basic job resources are at the top of all of the queues, of all the basic resources, required by said first capability resource;

g) placing second basic job resources, which are components of a second capability resource, which follow said first basic job resource in a basic resource queue, in an "Active" state ready for processing after said first basic job resource, if said first and second basic job resources in said queue are submitted by the same job service and if said second basic job resource is for the same sub-job as said first basic job resource's sub-job.

7. A method as in claim 6 wherein, said sub-jobs are placed in said queues of said basic resources in the order of their priority.

8. A method as in claim 6 wherein, said signal for said first sub-job comprises a first sub-job "Propose" for said first capability resource, from said job service to the JCM, and wherein said JCM determines the state of the first basic job resource for said sub-job upon receiving the "Propose", such that if the first basic job resource for said sub-job is at the top of all the basic resource job queues its state is "Active" and if said state is "Active" said JCM forwards an "Accept" to said job service so that said first sub-job is performed.

9. A method as in claim 8 wherein, said signal comprises a second sub-job "Propose" for a second capability resource, from said job service to the JCM, and wherein said JCM determines the state of the second basic job resources upon receiving said second "Propose", such that if a second basic job resource for said sub-job follows a first basic job resource and was proposed by the same job service for the same sub-job, then its state is "Active" and if said state is "Active" said JCM forwards an "Accept" to said job service so that said second basic job resource is performed after said first basic job resource is finished.

10. A method as in claim 9 wherein, prior to step (g) said JCM determines upon receiving said second "Propose", if such second basic job resource is next in a basic resource job queue after said first basic job resource and if it was proposed for the same sub-job by the same job service which proposed the first basic job resource, and following said step (g) said JCM forwards an "Accept" to said job service so that said second sub-job is performed upon the completion of the first sub-job.

11. An apparatus for prioritizing the use of multifunctional printing system's basic processing resources comprising:
   a) a controller having a job contention manager (JCM);
   b) a plurality of basic resources of the printing system with each of said basic resources having a job queue;
   c) means for one or more job services, at a desired time, sending a signal to said JCM to carry out a sub-job of a given job, said signal, for each of said sub-jobs, including information about the respective sub-job and its job service and priority;
   d) means, responsive to said signal, for said JCM to add, for a first video capability coordinated by a video control module and required by a first sub-job, a corresponding first basic job resource to the queues of each basic resource which said first video capability will require in order to perform said first sub-job;
   e) means for placing said first basic job resources for said first sub-job in an "Active" state ready for processing, if said first basic job resource for said first sub-job is at the top of all of the queues, of all the basic resources, required by said first video capability;
   f) means, responsive to said signal, for said JCM to add, for a second video capability coordinated by the video control module and required by said first sub-job, a corresponding second basic job resource sub-job to the queues of each basic resource which said second video capability will require in order to perform said first sub-job; and
   g) means for placing said second basic job resources, which follow said first basic job resource in a basic resource queue, in an "Active" state ready for processing after said first basic job resource, if the first and second basic job resources in said queue are submitted by the same job service and if the second basic job resource is for the same sub-job as the first basic job resource's sub-job.

12. An apparatus as in claim 11 including, means for placing said sub-jobs in said queues of said basic resources in the order of their priority.

13. A apparatus as in claim 11 wherein, said signal for said first sub-job comprises a first sub-job "Propose" for said first video capability from said job service to the JCM and wherein said JCM includes means for determining the state of the first basic job resource for said sub-job upon receiving the "Propose", such that if the first basic job resource for said sub-job is at the top of all the basic resource job queues its state is "Active" and said JCM further including means, if said state is "Active" for forwarding an "Accept" to said job service so that said first sub-job is performed.

14. A apparatus as in claim 13 wherein, said signal for said first sub-job comprises a second sub-job "Propose" for said second video capability from said job service to the JCM and wherein said JCM includes means for determining the state of the second basic job resource for said first sub-job upon receiving the "Propose", such that if the second basic job resource for said sub-job, follows said first basic job resource in a queue and was proposed by the same job service for the same sub-job, then its state is "Active" and said JCM further includes means, if said state is "Active" for forwarding an "Accept" to said job service so that said second basic job resource is performed after said first basic job resource is finished.

15. An apparatus as in claim 14 wherein, said JCM includes means responsive to receiving the "Propose" for said second video capability, for determining if said second basic job resource is next in a basic resource job queue after said first basic job resource and if it was proposed for the same sub-job, by the same job service as proposed the first basic job resource, and means for forwarding an "Accept" to said job service so that said second video capability is performed upon the completion of the first video capability.

16. An apparatus for managing the processing of a plurality of jobs in a multifunctional printing system in which at least one job is inputted for processing at one or more job services, said apparatus comprising:
   a) a controller having a job contention manager (JCM) for prioritizing the use of the printing system's basic processing resources
   b) a database including in at least a first level a plurality of capability resources associated with sub-jobs of said one or more job services and including in at least a second level a plurality of basic resources of the printing system, with each capability resource containing a list of the basic resources it needs to carry out its capability and each basic resource containing a list of the capability resources that depend upon it;
   c) each capability resource and each basic resource including a sub-job queue;
   d) means for each respective job service, at a desired time, to send a signal to said JCM to carry out a sub-job of said at least one job, said signal for each of said sub-jobs including information about the respective sub-job and its job service and priority;
   e) each respective job service including means, at a desired time, for sending a signal to said JCM to carry out a sub-job of said at least one job, said signal for each of said sub-jobs including information about the respective sub-job and its job service and priority;
   f) said JCM including, for said at least one sub-job received from said job service, means for creating respective capability job resources containing said information, and adding each such capability job resource, based on priority, to the respective capability resource, job queue;
   g) said JCM including means for adding, for each capability job resource, component basic job resources to the queues of each basic resource which a respective capability resource will require;
   h) said JCM including means for placing first basic job resources, which are components of a first capability resource, for said at least one sub-job, in an "Active"

state ready for processing, if said first basic job resources are at the top of all of the queues, of all the basic resources, required by said first capability resource;

i) said JCM including means for placing second basic job resources, which are components of a second capability resource, which follow said first basic job resource in a basic resource queue, in an "Active" state ready for processing after said first basic job resource, if said first and second basic job resources in said queue are submitted by the same job service and if said second basic job resource is for the same sub-job as said first basic job resource's sub-job.

17. An apparatus as in claim 16 including, means for placing said sub-jobs in said queues of said basic resources in the order of their priority.

18. A apparatus as in claim 16 wherein, said signal for said first sub-job comprises a first sub-job "Propose" for said first capability resource, from said job service to the JCM and wherein said JCM includes means for determining the state of the first basic job resource for said sub-job upon receiving the "Propose", such that if the first basic job resource for said sub-job is at the top of all the basic resource job queues its state is "Active" and said JCM further including means, if said state is "Active" for forwarding an "Accept" to said job service so that said first sub-job is performed.

19. A apparatus as in claim 18 wherein, said signal for said first sub-job comprises a second sub-job "Propose" for said second capability resource, from said job service to the JCM, and wherein said JCM includes means for determining the state of the second basic job resource for said first sub-job upon receiving the "Propose", such that if the second basic job resource for said sub-job, follows a first basic job resource in said queue and was proposed by the same job service for the same sub-job, then its state is "Active" and said JCM further includes means, if said state is "Active" for forwarding an "Accept" to said job service so that said second basic job resource is performed after said first basic job resource is finished.

20. An apparatus as in claim 19 wherein, said JCM includes means responsive to receiving the "Propose" for said second video capability, for determining if said second basic job resource is next in a basic resource job queue after a first basic job resource and if it was proposed for the same sub-job, by the same job service as proposed the first basic job resource, and means for forwarding an "Accept" to said job service so that said second capability resource is performed upon the completion of the first capability resource.

* * * * *